United States Patent
Shi et al.

(10) Patent No.: US 11,586,544 B2
(45) Date of Patent: Feb. 21, 2023

(54) DATA PREFETCHING METHOD AND TERMINAL DEVICE

(71) Applicant: HUAWEI TECHNOLOGIES CO., LTD., Guangdong (CN)

(72) Inventors: Gongzheng Shi, Shenzhen (CN); Jianliang Ma, Shanghai (CN); Liqiang Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/263,197

(22) PCT Filed: Jul. 23, 2019

(86) PCT No.: PCT/CN2019/097330
§ 371 (c)(1),
(2) Date: Jan. 26, 2021

(87) PCT Pub. No.: WO2020/020175
PCT Pub. Date: Jan. 30, 2020

(65) Prior Publication Data
US 2021/0149806 A1    May 20, 2021

(30) Foreign Application Priority Data
Jul. 27, 2018    (CN) .......................... 201810844371.6

(51) Int. Cl.
*G06F 12/08*    (2016.01)
*G06F 12/0862*    (2016.01)
*G06F 12/0811*    (2016.01)

(52) U.S. Cl.
CPC ...... *G06F 12/0862* (2013.01); *G06F 12/0811* (2013.01); *G06F 2212/1021* (2013.01); *G06F 2212/602* (2013.01)

(58) Field of Classification Search
CPC ............ G06F 12/0862; G06F 12/0811; G06F 2212/1021; G06F 2212/602
See application file for complete search history.

(56) References Cited

U.S. PATENT DOCUMENTS

| | | | |
|---|---|---|---|
| 6,421,763 B1 | 7/2002 | Arimilli et al. | |
| 2004/0128452 A1* | 7/2004 | Schmisseur | G06F 12/0804 711/143 |

(Continued)

FOREIGN PATENT DOCUMENTS

| | | |
|---|---|---|
| CN | 101105773 A | 1/2008 |
| CN | 101751245 A | 6/2010 |

(Continued)

OTHER PUBLICATIONS

Zhenman Fang, On Performance Optimization and Evaluation for Multicore Memory Systems, School of Computer Science, Furlan University, Apr. 2014, Submitted in total fulfillment of the requirements for the degree of Ph.D. in Computer Architecture, With an English Abstract, total 130 pages.

(Continued)

*Primary Examiner* — Jae U Yu

(57) ABSTRACT

A data prefetching method and a terminal device are provided. The CPU core cluster is configured to deliver a data access request to a first cache of the at least one level of cache, where the data access request carries a first address, and the first address is an address of data that the CPU core cluster currently needs to access in the memory. The prefetcher in the terminal device provided in embodiments of this application may generate a prefetch-from address, and load data corresponding to the generated prefetch-from address to the first cache. When needing to access the data, the CPU core cluster can read from the first cache, without (Continued)

a need to read from the memory. This helps increase an operating rate of the CPU core cluster.

17 Claims, 16 Drawing Sheets

(56) References Cited

U.S. PATENT DOCUMENTS

| | | | |
|---|---|---|---|
| 2005/0138277 A1* | 6/2005 | Koo | G06F 13/1689 |
| | | | 711/105 |
| 2009/0006813 A1 | 1/2009 | Singhal et al. | |
| 2009/0164833 A1 | 6/2009 | Sebastian | |
| 2012/0226866 A1* | 9/2012 | Bozek | G06F 9/45558 |
| | | | 711/E12.024 |
| 2014/0149678 A1 | 5/2014 | Chaudhary | |
| 2014/0281232 A1 | 9/2014 | Hagersten et al. | |
| 2016/0371187 A1 | 12/2016 | Roberts | |

FOREIGN PATENT DOCUMENTS

| | | |
|---|---|---|
| CN | 101751246 A | 6/2010 |
| CN | 102214146 A | 10/2011 |
| CN | 103226521 A | 7/2013 |
| CN | 104050092 A | 9/2014 |
| CN | 104808967 A | 7/2015 |
| CN | 105426322 A | 3/2016 |
| CN | 105677580 A | 6/2016 |
| CN | 106021128 A | 10/2016 |
| CN | 106164875 A | 11/2016 |
| CN | 104063330 B | 4/2017 |
| CN | 107479860 A | 12/2017 |
| CN | 108073525 A | 5/2018 |

OTHER PUBLICATIONS

Chinese Office Action dated Jun. 1, 2021 for Application No. 201810844371.6, 13 pages.
PCT Search Report dated Jul. 23, 2019 for Application No. PCT/CN2019/097330, 10 pages.
Extended European Search Report in EP Application No. 19840126.7 dated Sep. 28, 2021, 7 pages.
D M. Koppelman et al, Neighborhood Prefetching on Multiprocessors Using Instruction History, 2002, 10 pages.
Notice of Allowance for Chinese Application No. 201810844371.6 dated Mar. 30, 2022, 5 pages.

* cited by examiner

DATA PREFETCHING METHOD AND TERMINAL DEVICE

CROSS-REFERENCE TO RELATED APPLICATIONS

This application is a National Stage of International Application No. PCT/CN2019/097330, filed on Jul. 23, 2019, which claims priority to Chinese Patent Application No. 201810844371.6, filed on Jul. 27, 2018, both of which are hereby incorporated by reference in their entireties.

TECHNICAL FIELD

This application relates to the field of terminal technologies, and in particular, to a data prefetching method and a terminal device.

BACKGROUND

With the popularization of terminal devices, various application programs emerge constantly, for example, Tencent chatting software (QQ), WeChat, email box, Honor of Kings, to meet various requirements of users. Usually, such application programs on a terminal device run on a central processing unit (CPU) to implement corresponding functions.

An operating speed of an application program on a CPU greatly affects user experience. Using the Honor of Kings as an example, if CPU performance is relatively poor, a gaming picture is prone to be frozen, that is, poor smoothness is caused, resulting in poor user experience. Therefore, how to improve CPU performance is a problem faced by all parties.

SUMMARY

Embodiments of this application provide a data prefetching method and a terminal device, to improve CPU performance.

According to a first aspect, an embodiment of this application provides a terminal device. For example, the terminal device is a smartphone, an iPad, etc. The terminal device includes a CPU core cluster, three levels of caches, a prefetcher, and a memory. The CPU core cluster is configured to deliver a data access request to a first cache of the three levels of caches, where the data access request carries a first address, and the first address is an address of data that the CPU core cluster currently needs to access in the memory. The prefetcher is configured to generate a first prefetch-from address based on a first prefetching algorithm, the first address, and a historical data access request; and load, from the memory to the first cache based on the first prefetch-from address, data corresponding to the first prefetch-from address.

In this embodiment of this application, the prefetcher in the terminal device may generate the prefetch-from address based on the first address of the data currently required by the CPU core cluster in the memory, the historical data access request, and the prefetching algorithm; and load the data corresponding to the generated prefetch-from address to the first cache. When subsequently needing the data corresponding to the prefetch-from address, the CPU core cluster can read from the first cache, without a need to read from the memory. This helps increase an operating rate of the CPU core cluster.

In a possible implementation, that the prefetcher is configured to generate a first prefetch-from address based on a first prefetching algorithm, the first address, and a historical access request includes: the prefetcher is configured to generate a first address offset based on the first prefetching algorithm and an address carried in the historical data access request; and the prefetcher is configured to generate the first prefetch-from address based on the first address offset and the first address.

In this embodiment of this application, the prefetcher in the terminal device calculates an address offset based on the historical data access request and the prefetching algorithm, and then determines the prefetch-from address based on the address offset and the first address of the data that the CPU core cluster currently needs to access in the memory. In this way, the prefetcher can determine the prefetch-from address in real time based on the first address of the data that currently needs to be accessed in the memory, and load the data corresponding to the prefetch-from address to the first cache. When subsequently needing to access the data corresponding to the prefetch-from address, the CPU core cluster can read from the first cache, without a need to read from the memory. This increases the operating rate of the CPU core cluster.

In a possible implementation, the first cache is a level 3 cache of the three levels of caches.

In this embodiment of this application, a last level cache of the three levels of caches in the terminal device, that is, the level 3 cache, has a prefetching capability. Specifically, the prefetcher may generate the prefetch-from address based on a historical data access request concerning the last level cache, the first address of the data that the CPU core cluster currently needs to access in the memory, and the first prefetching algorithm; and load the data corresponding to the prefetch-from address to the last level cache. When subsequently needing to access the data corresponding to the prefetch-from address, the CPU core cluster can read from the last level cache, without a need to read from the memory. This increases the operating rate of the CPU core cluster.

In a possible implementation, the CPU core cluster is configured to deliver a data access request to a first cache of the three levels of caches and includes: the CPU core cluster being configured to deliver the data access request to a level 1 cache of the three levels of caches, where a cache controller of the level 1 cache is configured to send the data access request to a level 2 cache when determining that the data corresponding to the first address does not exist in the level 1 cache; and a cache controller of the level 2 cache being configured to send the data access request to the level 3 cache when determining that the data corresponding to the first address does not exist in the level 2 cache. Alternatively, the CPU core cluster is configured to deliver a data access request to a first cache of the three levels of caches and includes: the CPU core cluster being configured to deliver the data access request to a level 1 cache of the three levels of caches, where a cache controller of the level 1 cache is configured to send the data access request to a level 2 cache when determining that the data corresponding to the first address does not exist in the level 1 cache; a cache controller of the level 2 cache being configured to feed back response information to the CPU core cluster when determining that the data corresponding to the first address does not exist in the level 2 cache; and after receiving the response information, the CPU core cluster delivers the data access request to the level 3 cache.

In this embodiment of this application, the CPU core cluster may deliver the data access request to the first cache of the three levels of caches in at least two manners. Manner 1: The CPU core cluster delivers the data access request to the level 1 cache of the three levels of caches; when the data corresponding to the first address does not exist in the level 1 cache, the data access request is sent to the level 2 cache; and when the data corresponding to the first address does not exist in the level 2 cache, the data access request is sent to the level 3 cache. Manner 2: The CPU core cluster delivers the data access request to the level 1 cache of the three levels of caches; when the data corresponding to the first address does not exist in the level 1 cache, the data access request is sent to the level 2 cache; when the data corresponding to the first address does not exist in the level 2 cache, the response information is fed back to the CPU core cluster; and after receiving the response information, the CPU core cluster delivers the data access request to the level 3 cache. The last level cache of the three levels of caches in the terminal device, that is, the level 3 cache, has a prefetching capability. Specifically, the prefetcher may generate the prefetch-from address based on the historical data access request concerning the last level cache, the first address of the data that the CPU core cluster currently needs to access in the memory, and the first prefetching algorithm; and load the data corresponding to the prefetch-from address to the last level cache. When subsequently needing to access the data corresponding to the prefetch-from address, the CPU core cluster can read from the last level cache, without a need to read from the memory. This increases the operating rate of the CPU core cluster.

In a possible implementation, the prefetcher stores a plurality of prefetching algorithms, and the prefetcher determines the first prefetching algorithm from the plurality of prefetching algorithms based on an application program currently running on the terminal device.

In this embodiment of this application, the prefetcher in the terminal device stores plurality of prefetching algorithms, and the terminal device can determine a prefetching algorithm from the plurality of prefetching algorithms based on a currently running application program. In this way, the terminal device may use different prefetching algorithms when running different application programs, providing relatively high flexibility.

In a possible implementation, the prefetcher determines the first prefetching algorithm based on a hit rate or a miss rate in data prefetching, where the hit rate is a ratio of data that is of prefetched data and that is accessed by the CPU core cluster to the prefetched data, and the miss rate is a ratio of data that is of the prefetched data and that is not accessed by the CPU core cluster to the prefetched data.

In this embodiment of this application, the terminal device may determine the first prefetching algorithm based on the hit rate or the miss rate in the data prefetching. For example, the terminal device may select a prefetching algorithm corresponding to a relatively high hit rate (for example, higher than a preset hit rate) as the first prefetching algorithm, or select a prefetching algorithm corresponding to a relatively low miss rate (for example, lower than a preset miss rate) as the first prefetching algorithm. In this way, the terminal device can select a prefetching algorithm corresponding to a relatively high hit rate. In other words, the ratio of the data that is of the prefetched data and that is accessed by the CPU core cluster to the prefetched data is relatively large. This helps increase the operating rate of the CPU core cluster.

In a possible implementation, the prefetcher has N prefetching algorithms, where each prefetching algorithm takes effect in one period. The prefetcher is further configured to: perform data prefetching in each of N periods based on a prefetching algorithm that takes effect in the period; determine a first hit rate of data prefetching performed based on the prefetching algorithm that takes effect in each of the N periods, to obtain N first hit rates; and determine a highest first hit rate of the N first hit rates, and determine that a prefetching algorithm corresponding to the highest first hit rate is the first prefetching algorithm, where the first hit rate is a ratio, to prefetched data, of data that is of the prefetched data and that is accessed by the CPU core cluster after the prefetched data is stored to the first cache by the prefetcher based on the prefetching algorithm that takes effect in the period.

In this embodiment of this application, the prefetcher in the terminal device has N prefetching algorithms, where each prefetching algorithm takes effect in one period. The prefetcher may select a prefetching algorithm of the N prefetching algorithms that corresponds to a highest hit rate as the first prefetching algorithm. In this way, the terminal device can use a prefetching algorithm corresponding to a relatively high hit rate for data prefetching. In other words, the ratio of the data that is of the prefetched data and that is accessed by the CPU core cluster to the prefetched data is relatively large. This helps increase the operating rate of the CPU core cluster.

In a possible implementation, the memory is a DDR SDRAM.

In this embodiment of this application, there may be a plurality of types of memories, and the DDR SDRAM is just an example. This is not limited in this embodiment of this application.

According to a second aspect, an embodiment of the present technology provides a data prefetching method. The method is applicable to a terminal device. For example, the terminal device is a smartphone or an iPad. The method includes: delivering a data access request to a first cache of three levels of caches, where the data access request carries a first address, and the first address is an address of data that a CPU core cluster currently needs to access in the memory; generating a first prefetch-from address based on a first prefetching algorithm, the first address, and a historical data access request; and loading, from the memory to the first cache based on the first prefetch-from address, data corresponding to the first prefetch-from address.

In a possible implementation, the generating a first prefetch-from address based on a first prefetching algorithm, the first address, and a historical access request includes: generating a first address offset based on the first prefetching algorithm and an address carried in the historical data access request; and generating the first prefetch-from address based on the first address offset and the first address.

In a possible implementation, the first cache is a level 3 cache of the three levels of caches.

In a possible implementation, the delivering a data access request to a first cache of three levels of caches includes: delivering the data access request to a level 1 cache of the three levels of caches, where a cache controller of the level 1 cache is configured to send the data access request to a level 2 cache when determining that the data corresponding to the first address does not exist in the level 1 cache; and a cache controller of the level 2 cache is configured to send the data access request to the level 3 cache when determining that the data corresponding to the first address does not exist in the level 2 cache. Alternatively, the delivering a data access request to a first cache of three levels of caches includes: delivering the data access request to a level 1 cache of the three levels of caches, where a cache controller of the level 1 cache is configured to send the data access request to a level 2 cache when determining that the data corresponding to the first address does not exist in the level 1 cache; a cache controller of the level 2 cache is configured to generate response information when determining that the data corresponding to the first address does not exist in the level 2 cache; and receiving the response information, and delivering the data access request to the level 3 cache of the three levels of caches.

In a possible implementation, before the generating a first prefetch-from address based on a first prefetching algorithm, the first address, and a historical data access request, the method further includes: determining the first prefetching algorithm from a plurality of prefetching algorithms based on an application program currently running on the terminal device.

In a possible implementation, the terminal determines the first prefetching algorithm based on a hit rate or a miss rate in data prefetching, where the hit rate is a ratio of data that is of prefetched data and that is accessed by the CPU core cluster to the prefetched data, and the miss rate is a ratio of data that is of the prefetched data and that is not accessed by the CPU core cluster to the prefetched data.

In a possible implementation, the terminal has N prefetching algorithms, where each prefetching algorithm takes effect in one period. The method further includes: performing data prefetching in each of N periods based on a prefetching algorithm that takes effect in the period; determining a first hit rate of data prefetching performed based on the prefetching algorithm that takes effect in each of the N periods, to obtain N first hit rates; and determining a highest first hit rate of the N first hit rates, and determining that a prefetching algorithm corresponding to the highest first hit rate is the first prefetching algorithm, where the first hit rate is a ratio, to prefetched data, of data that is of the prefetched data and that is accessed by the CPU core cluster after the prefetched data is stored to the first cache by the prefetcher based on the prefetching algorithm that takes effect in the period.

In a possible implementation, the memory is a DDR SDRAM.

According to a third aspect, an embodiment of the present technology provides a terminal device. For example, the terminal device is a smartphone or an iPad. The terminal device includes a CPU core cluster, at least one level of cache, a prefetcher, and a memory. The CPU core cluster is configured to deliver a data access request to a first cache of the at least one level of cache, where the data access request carries a first address, and the first address is an address of data that the CPU core cluster currently needs to access in the memory. The prefetcher is configured to generate a first prefetch-from address based on a first prefetching algorithm, the first address, and a historical data access request; and load, from the memory to the first cache based on the first prefetch-from address, data corresponding to the first prefetch-from address.

In this embodiment of this application, the terminal device has at least one level of cache, for example, one level of cache, two levels of caches, three levels of caches, or four levels of caches. The prefetcher in the terminal device may generate the prefetch-from address based on the first address of the data currently required by the CPU core cluster in the memory, the historical data access request, and a prefetching algorithm; and load data corresponding to the generated prefetch-from address to the first cache (e.g., a specific level of cache of the at least one level of cache). When subsequently needing the data corresponding to the prefetch-from address, the CPU core cluster can read from the first cache, without a need to read from the memory. This helps increase an operating rate of the CPU core cluster.

In a possible implementation, that the prefetcher is configured to generate a first prefetch-from address based on a first prefetching algorithm, the first address, and a historical access request includes: the prefetcher is configured to generate a first address offset based on the first prefetching algorithm and an address carried in the historical data access request; and the prefetcher is configured to generate the first prefetch-from address based on the first address offset and the first address.

In this embodiment of this application, the prefetcher in the terminal device may calculate an address offset based on the historical data access request and the prefetching algorithm, and then determine the prefetch-from address based on the address offset and the first address of the data that the CPU core cluster currently needs to access in the memory. In this way, the prefetcher can determine the prefetch-from address in real time based on the first address of the data that currently needs to be accessed in the memory, and load the data corresponding to the prefetch-from address to the first cache. When subsequently needing to access the data corresponding to the prefetch-from address, the CPU core cluster can read from the first cache, without a need to read from the memory. This helps increase the operating rate of the CPU core cluster.

In a possible implementation, the first cache is a last level cache of the at least one level of cache.

In this embodiment of this application, the terminal device has at least one level of cache, for example, one level of cache, two levels of caches, three levels of caches, or four levels of caches. The last level cache of the at least one level of cache has a prefetching capability. Specifically, the prefetcher may generate the prefetch-from address based on a historical data access request concerning the last level cache, the first address of the data that the CPU core cluster currently needs to access in the memory, and the prefetching algorithm; and load the data corresponding to the prefetch-from address to the last level cache. When subsequently needing to access the data corresponding to the prefetch-from address, the CPU core cluster can read from the last level cache, without a need to read from the memory. This increases the operating rate of the CPU core cluster.

In a possible implementation, the at least one level of cache includes two levels of caches, and the first cache is a level 2 cache of the two levels of caches. The CPU core cluster is configured to deliver a data access request to a first cache of the at least one level of cache and includes: the CPU core cluster being configured to deliver the data access request to a level 1 cache of the two levels of caches, where a cache controller of the level 1 cache is configured to send the data access request to the level 2 cache when determining that the data corresponding to the first address does not exist in the level 1 cache. Alternatively, the CPU core cluster is configured to deliver a data access request to a first cache of the at least one level of cache and includes: the CPU core cluster being configured to deliver the data access request to a level 1 cache of the two levels of caches, where a cache controller of the level 1 cache is configured to feed back response information to the CPU core cluster when determining that the data corresponding to the first address does not exist in the level 1 cache; and after receiving the response information, the CPU core cluster delivers the data access request to the level 2 cache of the two levels of caches.

In this embodiment of this application, for example, the at least one level of cache includes two levels of caches. The first cache is a last level cache of the two levels of caches, that is, the level 2 cache. The CPU core cluster may deliver the data access request to the level 2 cache in at least two manners. Manner 1: The CPU core cluster delivers the data access request to the level 1 cache of the two levels of caches; and when the data corresponding to the first address does not exist in the level 1 cache, the data access request is sent to the level 2 cache. Manner 2: The CPU core cluster delivers the data access request to the level 1 cache of the two levels of caches; when the data corresponding to the first address does not exist in the level 1 cache, the response information is fed back to the CPU core cluster; and after receiving the response information, the CPU core cluster delivers the data access request to the level 2 cache. The last level cache of the two levels of caches in the terminal device, that is, the level 2 cache, has a prefetching capability. Specifically, the prefetcher may generate the prefetch-from address based on the historical data access request concerning the last level cache, the first address of the data that the CPU core cluster currently needs to access in the memory, and the prefetching algorithm; and load the data corresponding to the prefetch-from address to the last level cache. When subsequently needing to access the data corresponding to the prefetch-from address, the CPU core cluster can read from the last level cache, without a need to read from the memory. This increases the operating rate of the CPU core cluster.

In a possible implementation, the prefetcher stores a plurality of prefetching algorithms, and the prefetcher determines the first prefetching algorithm from the plurality of prefetching algorithms based on an application program currently running on the terminal device.

In this embodiment of this application, the prefetcher in the terminal device has a plurality of prefetching algorithms, and the terminal device can determine a prefetching algorithm from the plurality of prefetching algorithms based on a currently running application program. In this way, the terminal device may use different prefetching algorithms when running different application programs, providing relatively high flexibility.

In a possible implementation, the prefetcher determines the first prefetching algorithm based on a hit rate or a miss rate in data prefetching, where the hit rate is a ratio of data that is of prefetched data and that is accessed by the CPU core cluster to the prefetched data, and the miss rate is a ratio of data that is of the prefetched data and that is not accessed by the CPU core cluster to the prefetched data.

In this embodiment of this application, the terminal device may determine the first prefetching algorithm based on the hit rate or the miss rate in the data prefetching. For example, the terminal device may select a prefetching algorithm corresponding to a relatively high hit rate (for example, higher than a preset hit rate) as the first prefetching algorithm, or select a prefetching algorithm corresponding to a relatively low miss rate (for example, lower than a preset miss rate) as the first prefetching algorithm. In this way, the terminal device can select a prefetching algorithm corresponding to a relatively high hit rate. In other words, the ratio of the data that is of the prefetched data and that is accessed by the CPU core cluster to the prefetched data is relatively large. This helps increase the operating rate of the CPU core cluster.

In a possible implementation, the prefetcher has N prefetching algorithms, where each prefetching algorithm takes effect in one period. The prefetcher is further configured to: perform data prefetching in each of N periods based on a prefetching algorithm that takes effect in the period; determine a first hit rate of data prefetching performed based on the prefetching algorithm that takes effect in each of the N periods, to obtain N first hit rates; and determine a highest first hit rate of the N first hit rates, and determine that a prefetching algorithm corresponding to the highest first hit rate is the first prefetching algorithm, where the first hit rate is a ratio, to prefetched data, of data that is of the prefetched data and that is accessed by the CPU core cluster after the prefetched data is stored to the first cache by the prefetcher based on the prefetching algorithm that takes effect in the period.

In this embodiment of this application, the prefetcher in the terminal device has N prefetching algorithms, where each prefetching algorithm takes effect in one period. The prefetcher may select a prefetching algorithm of the N prefetching algorithms that corresponds to a highest hit rate as the first prefetching algorithm. In this way, the terminal device can use a prefetching algorithm corresponding to a relatively high hit rate for data prefetching. In other words, the ratio of the data that is of the prefetched data and that is accessed by the CPU core cluster to the prefetched data is relatively large. This helps increase the operating rate of the CPU core cluster.

In a possible implementation, the memory is a DDR SDRAM.

In this embodiment of this application, there may be a plurality of types of memories, and the DDR SDRAM is just an example. This is not limited in this embodiment of this application.

According to a fourth aspect, an embodiment of the present technology provides a data prefetching method. The method is applicable to a terminal device. For example, the terminal device is a smartphone or an iPad. The method includes: delivering a data access request to a first cache of at least one level of cache, where the data access request carries a first address, and the first address is an address of data that a CPU core cluster currently needs to access in a memory; generating a first prefetch-from address based on a first prefetching algorithm, the first address, and a historical data access request; and loading, from the memory to the first cache based on the first prefetch-from address, data corresponding to the first prefetch-from address.

In a possible implementation, the generating a first prefetch-from address based on a first prefetching algorithm, the first address, and a historical access request includes: generating a first address offset based on the first prefetching algorithm and an address carried in the historical data access request; and generating the first prefetch-from address based on the first address offset and the first address.

In a possible implementation, the first cache is a last level cache of the at least one level of cache.

In a possible implementation, if the at least one level of cache includes two levels of caches, and the first cache is a level 2 cache of the two levels of caches, the delivering a data access request to a first cache of at least one level of cache includes: delivering the data access request to a level 1 cache of the two levels of caches, where a cache controller of the level 1 cache is configured to send the data access request to the level 2 cache when determining that the data corresponding to the first address does not exist in the level 1 cache. Alternatively, the delivering a data access request to a first cache of at least one level of cache includes: delivering the data access request to a level 1 cache of the two levels of caches, where a cache controller of the level 1 cache is configured to generate response information when determining that the data corresponding to the first address does not exist in the level 1 cache; and delivering the data access request to the level 2 cache of the two levels of caches based on the response information.

In a possible implementation, before the generating a first prefetch-from address based on a first prefetching algorithm, the first address, and a historical data access request, the method further includes: determining the first prefetching algorithm from a plurality of prefetching algorithms based on an application program currently running on the terminal device.

In a possible implementation, the terminal determines the first prefetching algorithm based on a hit rate or a miss rate in data prefetching, where the hit rate is a ratio of data that is of prefetched data and that is accessed by the CPU core cluster to the prefetched data, and the miss rate is a ratio of data that is of the prefetched data and that is not accessed by the CPU core cluster to the prefetched data.

In a possible implementation, the terminal has N prefetching algorithms, where each prefetching algorithm takes effect in one period. The method further includes: performing data prefetching in each of N periods based on a prefetching algorithm that takes effect in the period; determining a first hit rate of data prefetching performed based on the prefetching algorithm that takes effect in each of the N periods, to obtain N first hit rates; and determining a highest first hit rate of the N first hit rates, and determining that a prefetching algorithm corresponding to the highest first hit rate is the first prefetching algorithm, where the first hit rate is a ratio, to prefetched data, of data that is of the prefetched data and that is accessed by the CPU core cluster after the prefetched data is stored to the first cache by the prefetcher based on the prefetching algorithm that takes effect in the period.

In a possible implementation, the memory is a DDR SDRAM.

According to a fifth aspect, an embodiment of the present technology provides a terminal device, including at least one processor and a memory. The memory is configured to store one or more computer programs. When the one or more computer programs stored in the memory are executed by the at least one processor, the terminal device is enabled to implement the method according to any one of the second aspect or the possible implementations of the second aspect. Alternatively, when the one or more computer programs stored in the memory are executed by the at least one processor, the terminal device is enabled to implement the method according to any one of the fourth aspect or the possible implementations of the fourth aspect.

According to a sixth aspect, an embodiment of this application further provides a terminal device. The terminal device includes modules/units for performing the method according to any one of the second aspect or the possible implementations of the second aspect. Alternatively, the terminal device includes modules/units for performing the method according to any one of the fourth aspect or the possible implementations of the fourth aspect. These modules/units may be implemented by hardware, or may be implemented by hardware executing corresponding software.

According to a seventh aspect, an embodiment of the present technology further provides a computer storage medium. The computer readable storage medium includes a computer program. When the computer program runs on a terminal device, the terminal device is enabled to perform the method according to any one of the second aspect or the possible implementations of the second aspect. Alternatively, when the computer program runs on a terminal device, the terminal device is enabled to perform the method according to any one of the fourth aspect or the possible implementations of the fourth aspect.

According to an eighth aspect, an embodiment of the present technology provides a computer program product including an instruction. When the computer program product runs on a terminal, the terminal is enabled to perform the method according to any one of the second aspect or the possible implementations of the second aspect. Alternatively, when the computer program product runs on a terminal, the terminal is enabled to perform the method according to any one of the fourth aspect or the possible implementations of the fourth aspect.

The CPU core cluster in the foregoing implementations may include a big core cluster, a little core cluster, or a big core cluster and a little core cluster.

DESCRIPTION OF EMBODIMENTS

The following describes the technical solutions in the embodiments of this application with reference to the accompanying drawings in the embodiments of this application.

In the following, some terms in this application are described, to help a person skilled in the art have a better understanding.

A terminal device may also be referred to as user equipment (UE), and may be a smartphone, a tablet computer, various wearable devices, a vehicle-mounted device, a palmtop computer, or the like. The terminal device may be installed with various application programs (or "app" for short).

For example, an application program is a computer program for completing one or more jobs. Usually, an application program can implement a corresponding function, and may have a visualized user interface. A user may interact with the terminal device through the user interface. There are various types of application programs. For example, the application programs include various gaming apps such as Honor of Kings, QQ Dou dizhu, and QQ Anipop; various shopping apps such as Taobao and JD; various travelling apps such as Ctrip app; various apps for obtaining locations such as Baidu Maps and AutoNavi; and various chatting and communication apps such as SMS messaging, multimedia messaging, various email boxes, WeChat, Tencent chatting software, WhatsApp Messenger, Line, Instagram, Kakao Talk, and Dingtalk.

Embodiments of this application relate to a prefetching technology. The terminal device is provided with a technology for prefetching data that a CPU may need to a cache. For example, in a running process, the CPU may prefetch a piece of data from a memory to a cache. In this way, if the CPU needs to access the data in a subsequent running process, because the data is already in the cache, the CPU can directly access the data in the cache, without a need to search for the data in the memory. In other words, by using the prefetching technology, a delay caused when the CPU accesses the memory can be reduced, thereby improving an operating rate of the CPU.

The embodiments of this application may relate to a plurality of prefetching algorithms, for example, a one-block look-ahead (OBL) algorithm and an infinite-block look-ahead (IBL) algorithm.

A prefetch-from address mentioned in the embodiments of this application is an address calculated by the terminal device based on a prefetching algorithm. The prefetch-from address may be used to indicate an address, in the memory, of data subsequently required by the CPU. The CPU may search, in the memory based on the prefetch-from address, for data corresponding to the prefetch-from address, and load the data to the cache.

"A plurality of" mentioned in the embodiments of this application means two or more.

Figure 1:
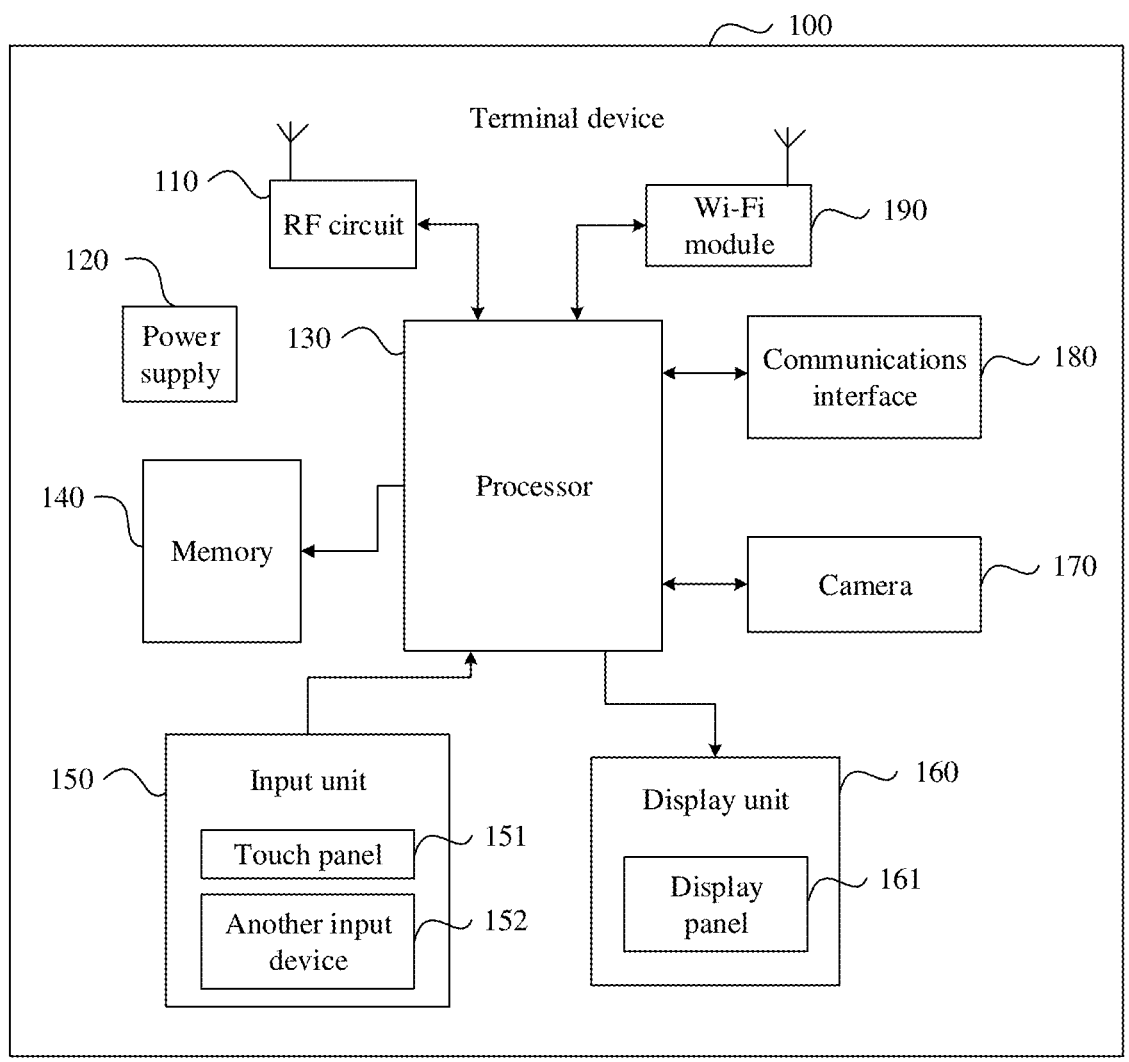
FIG. 1 is a schematic structural diagram of a terminal device according to an embodiment of this application.

In addition, it should be understood that in the descriptions of this application, terms such as "first" and "second" are merely intended for distinction in description, but should not be construed as indicating or implying relative importance or indicating or implying a sequence. The embodiments of this application provide a data prefetching method and a terminal device, where the method is applicable to the terminal device. FIG. 1 is a structural diagram of a possible terminal device. As shown in FIG. 1, the terminal device 100 includes components such as a radio frequency (RF) circuit 110, a power source 120, a processor 130, a memory 140, an input unit 150, a display unit 160, a camera 170, a communications interface 180, and a wireless fidelity (wireless fidelity, Wi-Fi) module 190. A person skilled in the art can understand that the structure of the terminal device shown in FIG. 1 does not constitute any limitation on the terminal device. The terminal device provided in this embodiment of this application may include more or fewer components than those illustrated in the figure, some components may be combined, or there may be different component arrangements.

The following describes in detail the constituent components of the terminal device 100 with reference to FIG. 1.

The RF circuit 110 may be configured to receive and send data in a communication or call process. Specifically, after receiving downlink data from a base station, the RF circuit 110 sends the downlink data to the processor 130 for processing, and also sends to-be-sent uplink data to the base station. Usually, the RF circuit 110 includes, but is not limited to, an antenna, at least one amplifier, a transceiver, a coupler, a low noise amplifier (LNA), a duplexer, and the like.

In addition, the RF circuit 110 may also communicate with a network and another device through wireless communication. The wireless communication may be performed by using any communications standard or protocol, including but not limited to global system for mobile communications (GSM), general packet radio service (GPRS), code division multiple access (CDMA), wideband code division multiple access (WCDMA), long term evolution (LTE), email, short messaging service (SMS), or the like.

A Wi-Fi technology is a short range wireless transmission technology. The terminal device 100 may be connected to an access point (AP) by using the Wi-Fi module 190, to access a data network. The Wi-Fi module 190 may be configured to receive and send data in a communication process.

The terminal device 100 may be physically connected to another device through the communications interface 180. Optionally, the communications interface 180 may be connected to a communications interface of the another device through a cable, to implement data transmission between the terminal device 100 and the another device.

In this embodiment of this application, the terminal device 100 can implement a communications service to send information to another contact. Therefore, the terminal device 100 needs to provide a data transmission function. In other words, the terminal device 100 needs to internally include a communications module. Although FIG. 1 shows communications modules such as the RF circuit 110, the Wi-Fi module 190, and the communications interface 180, it can be understood that the terminal device 100 includes at least one of the foregoing components or another communications module (for example, a Bluetooth module) that is configured to implement communication, to perform data transmission.

For example, when the terminal device 100 is a mobile phone, the terminal device 100 may include the RF circuit 110, and may further include the Wi-Fi module 190 and the Bluetooth module. When the terminal device 100 is a computer, the terminal device 100 may include the communications interface 180, and may further include the Wi-Fi module 190. When the terminal device 100 is a tablet computer, the terminal device 100 may include the Wi-Fi module. It can be understood that a computer and a tablet computer each may also include a Bluetooth module.

The memory 140 may be configured to store a software program. The processor 130 runs the software program stored in the memory 140, to perform various function applications and data processing of the terminal device 100.

Optionally, the memory 140 may include a memory with a program storage area and a memory with a data storage area. The program storage area may store an operating system, and software programs and/or modules of various application programs. The processor 130 may run the software programs and/or modules of various application programs stored in the memory 140, to implement corresponding functions. The data storage area may store data, various multimedia files such as pictures and video files, to facilitate calling by the processor 130.

In addition, the memory 140 may include a nonvolatile memory, for example, at least one magnetic disk storage device or a flash memory device.

The input unit 150 may be configured to receive digital or character information input by a user, and generate a key signal input related to a user setting and function control of the terminal device 100.

Optionally, the input unit 150 may include a touch panel 151 and another input device 152.

The touch panel 151 may collect a touch operation of a user on or near the touch panel 151 (for example, an operation performed on the touch panel 151 or near the touch panel 151 by the user by using any suitable object or accessory such as a finger or a stylus), and drive a corresponding connected apparatus according to a preset procedure. Optionally, the touch panel 151 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, and then sends the contact coordinates to the processor 130; and can receive and execute a command sent by the processor 130. Additionally, the touch panel 151 may be implemented in various forms such as resistive, capacitive, infrared ray, and surface acoustic wave forms.

Optionally, the another input device 152 may include, but is not limited to, one or more of a physical keyboard, a functional key (such as a volume control key and an on/off key), a track ball, a mouse, and a joystick.

The display unit 160 may be configured to display information input by the user, or information provided for the user, and various menus of the terminal device 100. The display unit 160 may be a display system of the terminal device 100, and is configured to present an interface to implement human-computer interaction.

The display unit 160 may include a display panel 161. Optionally, the display panel 161 may be configured in a form of a liquid crystal display (LCD), an organic light-emitting diode (OLED), or the like.

The touch panel 151 and the display 160 may be construed as a touchscreen.

Further, the touch panel 151 may cover the display panel 161. When detecting a touch operation on or near the touch panel 151, the touch panel 151 transfers the operation to the processor 130 to determine a touch event type. Then the processor 130 provides a corresponding visual output on the display panel 161 based on the touch event type.

In FIG. 1, the touch panel 151 and the display panel 161 implement input and output functions of the terminal device 100 as two independent components, but in some embodiments, the touch panel 151 may be integrated with the display panel 161 to implement the input and output functions of the terminal device 100.

The processor 130 is a control center of the terminal device 100, connects the components through various interfaces and lines, and executes various functions of the terminal device 100 and processes data by running or executing the software programs and/or modules stored in the memory 140 and calling the data stored in the memory 140, to implement a plurality of services of the terminal device.

Optionally, the processor 130 may be a CPU. The processor 130 may alternatively be an application processor and a modem processor.

Optionally, the processor 130 may include one or more processing units. Optionally, the processor 130 may be an application processor. Certainly, the processor 130 may alternatively be integrated with an application processor and a modem processor. The application processor mainly deals with the operating system, the user interface, the application programs, and the like. The modem processor mainly deals with wireless communication. It can be understood that the modem processor may alternatively not be integrated into the processor 130.

The camera 170 is configured to implement a photographing function of the terminal device 100, to take a photograph or make a video.

The terminal device 100 may further include the power source 120 (for example, a battery) that is configured to supply power to each component. Optionally, the power source 120 may be logically connected to the processor 130 through a power management system, to implement functions such as charging and discharging management and power consumption management by using the power management system.

Although not illustrated, the terminal device 100 may further include at least one sensor, an audio circuit, and the like.

For example, the terminal device 100 shown in FIG. 1 is a mobile phone, and the processor 130 is a CPU. When the user uses an application program in the terminal device 100, the CPU needs to run a software program of the application program, to implement a corresponding function of the application program. Specifically, when running the software program of the application program, the CPU may find the corresponding software program in the memory 140 and then run the software program. To increase an operating speed of the CPU, a cache technology may be introduced into the terminal device.

With a CPU cache technology, when reading data, the CPU first searches a cache for required data. If the data required by the CPU exists in the cache, the CPU may directly read the data from the cache. If the data required by the CPU does not exist in the cache, the CPU then searches the memory. For example, the memory may be a double data rate synchronous dynamic random access memory (DDR SDRAM). An operating speed of a CPU cache is much higher than that of the DDR SDRAM. Therefore, for the CPU, reading data from the CPU cache is much faster than reading data from the DDR SDRAM. Therefore, introduction of the CPU cache technology increases the operating rate of the CPU.

The CPU cache may be divided into a level 1 cache (e.g., L1 Cache) and a level 2 cache (e.g., L2 Cache). In a running process, the CPU first reads data from the level 1 cache; when required data does not exist in the level 1 cache, reads the data from the level 2 cache; and when the required data does not exist in the level 2 cache, reads data from the DDR SDRAM. Usually, when the CPU reads data, 80% of the data can be read from the level 1 cache, some data of the remaining 20% of the data can be read from the level 2 cache, and the other data can be read from the DDR SDRAM. Therefore, the level 1 cache and the level 2 cache can meet most requirements of the CPU, and the CPU reads a relatively small amount of data from the DDR SDRAM. This greatly increases the operating speed of the CPU.

Figure 2:
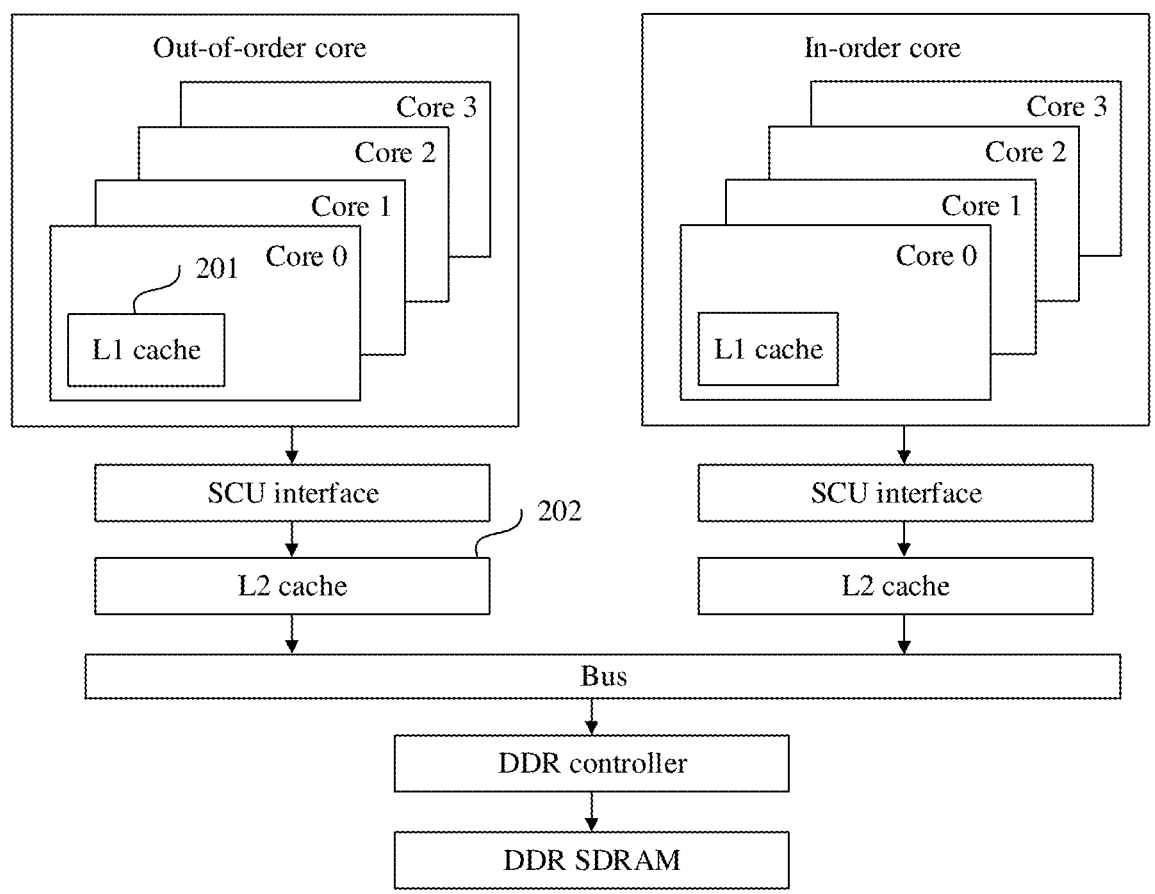
FIG. 2 is a schematic structural diagram of a terminal device having two levels of caches according to an embodiment of this application.

FIG. 2 is a schematic structural diagram of a terminal device having two levels of caches. As shown in FIG. 2, the terminal device includes a large-core (for example, out-of-order core) group and a small-core (for example, in-order core) group. The big core cluster includes four cores, which are a core 0 to a core 3. The little core cluster also includes four cores, which are a core 0 to a core 3. Each core may be integrated with a level 1 cache (e.g., L1 Cache). Different threads of an application program may be configured to run on different cores. For example, some threads of an application program are configured to run on the core 0 of the big core cluster, and the other threads are configured to run on the core 0 of the little core cluster. Running of the application program is completed jointly by the plurality of cores. Using the core 0 in the big core cluster as an example, when running a thread of the application program, the core 0 first reads data from a level 1 cache 201 of the core 0. If required data does not exist in the level 1 cache 201, the core 0 reads the data from a level 2 cache 202 through a snoop control unit (SCU) interface. When the required data does not exist in the level 2 cache 202, the core 0 reads the data from a DDR SDRAM through a bus.

Figure 3:
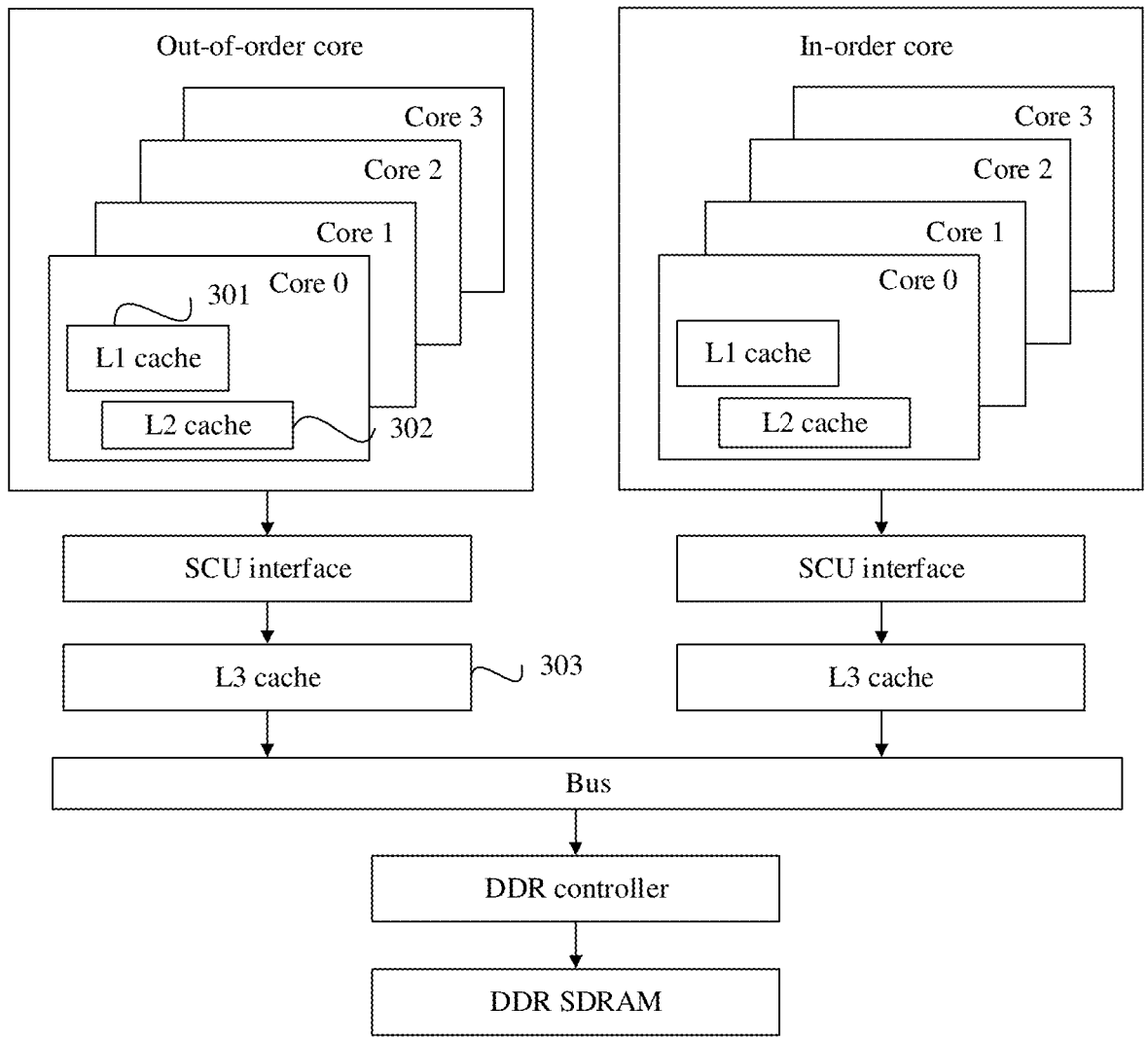
FIG. 3 is a schematic structural diagram of a terminal device having three levels of caches according to an embodiment of this application.

FIG. 3 is a schematic structural diagram of a terminal device having three levels of caches. A difference from FIG. 2 lies in that each core in a big core cluster and a little core cluster has a level 1 cache and a level 2 cache. Using a core 0 in the big core cluster as an example, when running a thread of an application program, the core 0 first reads data from a level 1 cache 301 of the core 0. If required data does not exist in the level 1 cache 301, the core 0 reads the data from a level 2 cache 302. When the required data does not exist in the level 2 cache 302, the core 0 reads the data from a level 3 cache 303 through an SCU interface. When the required data does not exist in the level 3 cache 303, the core 0 reads the data from a DDR SDRAM through a bus.

A capacity of a CPU cache is relatively small (e.g., because the CPU cache occupies a chip area, and the chip area cannot be excessively large). In other words, a level 1 cache and a level 2 cache store a relatively small amount of data. Therefore, to ensure as far as possible that data required by a CPU is stored in a CPU cache, a prefetching technology may be used in the terminal device (e.g., as described above).

The embodiments of this application provide a data prefetching method and a terminal device. The terminal device includes at least one level of cache, and a last level cache of the at least one level of cache has a prefetching capability. This improves operating efficiency of a CPU. The data prefetching method in the embodiments of this application is applicable to the terminal device having two levels of caches shown in FIG. 2, is applicable to the terminal device having three levels of caches shown in FIG. 3, or is applicable to a terminal device that may occur and that has four or more levels of caches.

Figure 4:
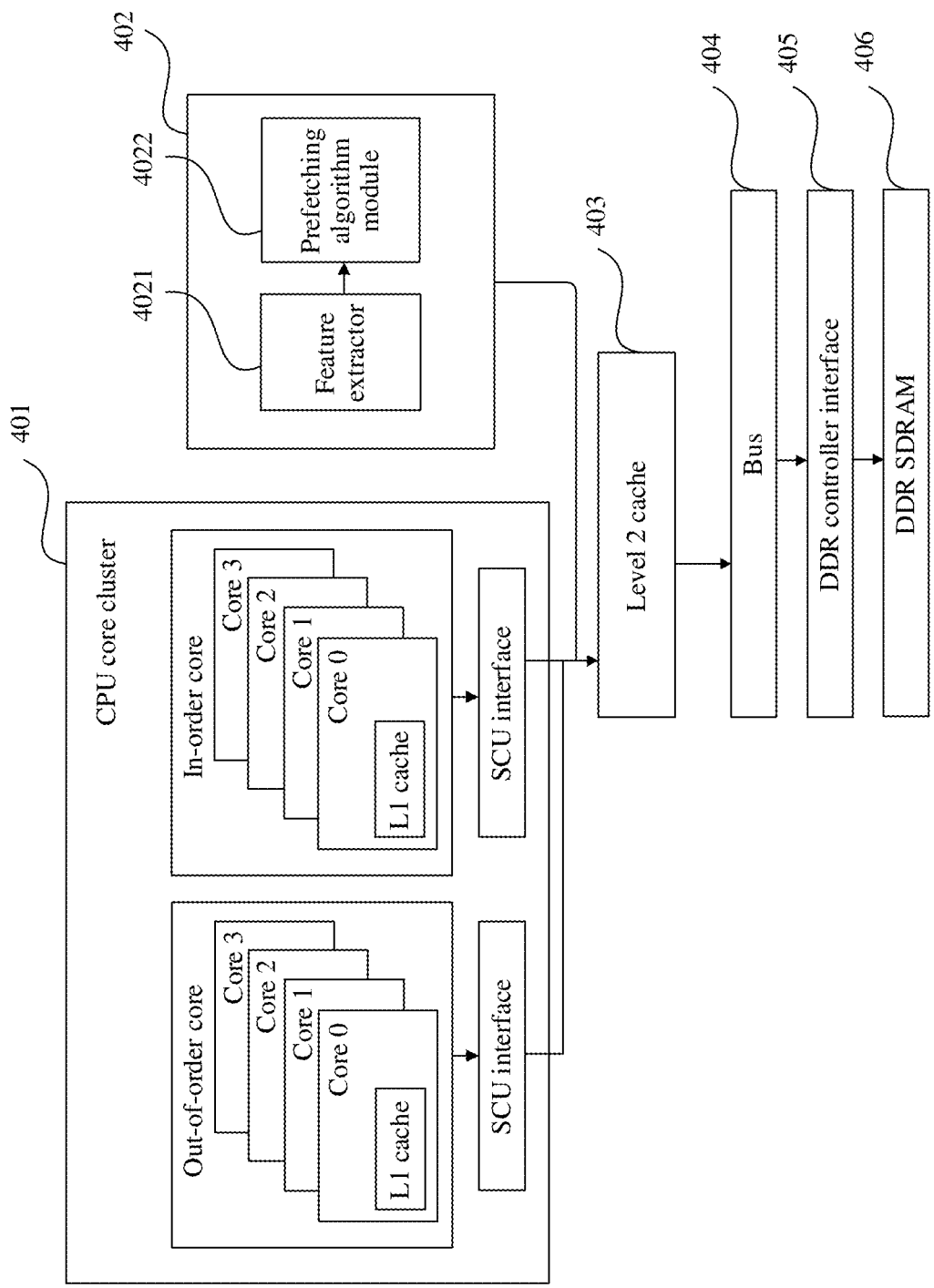
FIG. 4 is a schematic structural diagram of a terminal device having two levels of caches according to an embodiment of this application.

FIG. 4 is a schematic structural diagram of a terminal device having two levels of caches according to an embodiment of this application. As shown in FIG. 4, the terminal device 400 includes a CPU core cluster 401, a prefetcher 402, a level 2 cache (which is an LLC Cache) 403, a bus 404, a DDR controller 405, and a DDR SDRAM 406. The prefetcher 402 is communicatively connected to both the CPU core cluster 401 and the level 2 cache 403.

In this embodiment of this application, the prefetcher 402 may prestore one prefetching algorithm, or may prestore a plurality of prefetching algorithms. A processing manner may vary with a quantity of prefetching algorithms in the prefetcher 402. The following separately describes these two cases.

Figure 5:
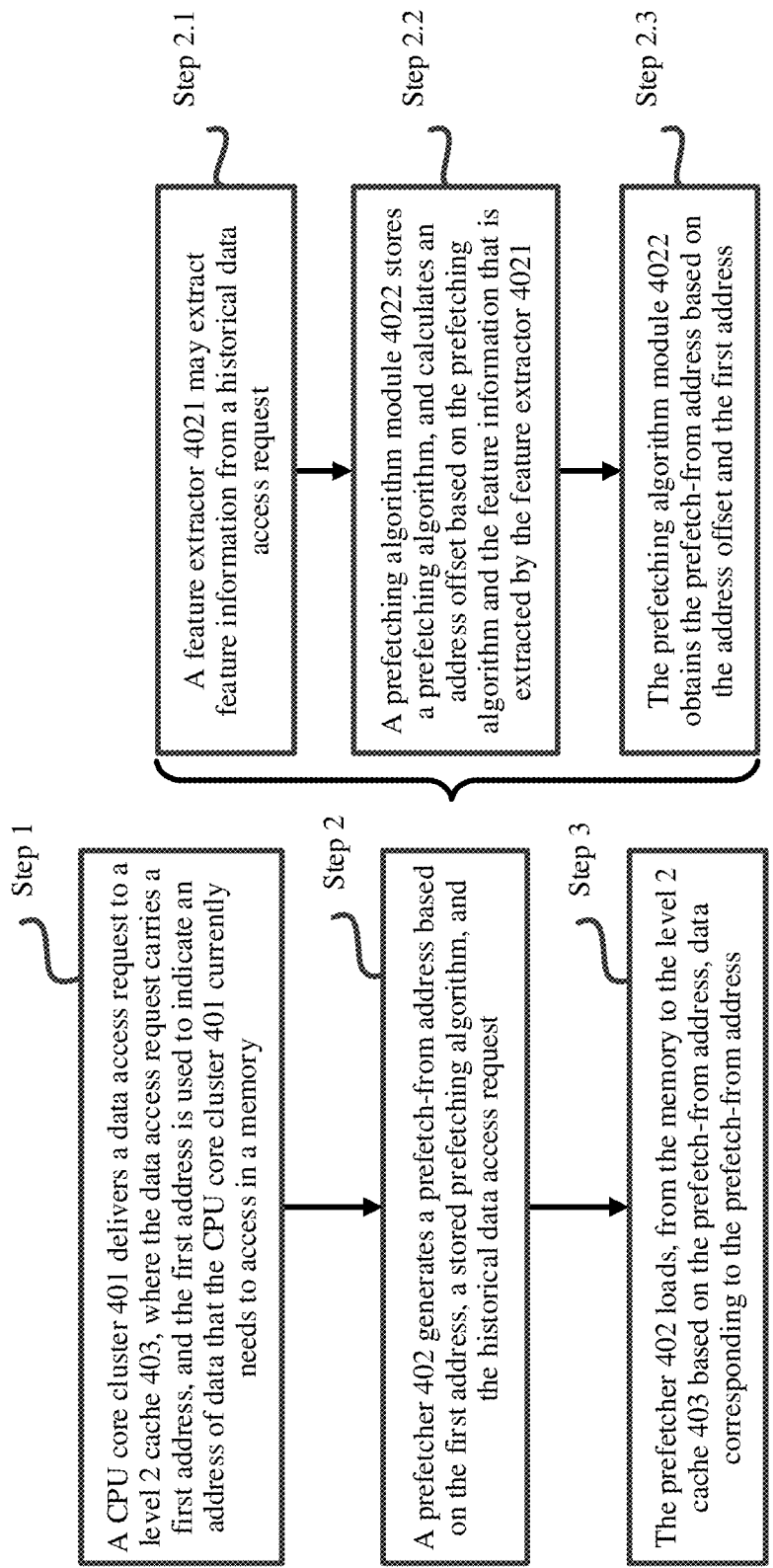
FIG. 5 is a schematic flowchart of a data prefetching method according to an embodiment of this application.

In an embodiment, the prefetcher 402 stores one prefetching algorithm. FIG. 5 is a schematic flowchart of a data prefetching method according to an embodiment of this application. In FIG. 5, for example, a terminal device is the terminal device 400 shown in FIG. 4. As shown in FIG. 5, the terminal device 400 implements data prefetching in the following steps.

Step 1. The CPU core cluster 401 delivers a data access request to the level 2 cache 403, where the data access request carries a first address, and the first address is used to indicate an address of data that the CPU core cluster 401 currently needs to access in the memory.

Step 1 may be implemented in a plurality of manners. In a first manner, the CPU core cluster 401 delivers the data access request to a level 1 cache. When the data corresponding to the first address does not exist in the level 1 cache, the level 1 cache sends the data access request to the level 2 cache. (For example, the level 1 cache has a cache controller. When determining that the data corresponding to the first address does not exist in the level 1 cache, the cache controller may forward the data access request to the level 2 cache). In a second manner, the CPU core cluster 401 delivers the data access request to a level 1 cache. When determining that the data corresponding to the first address does not exist in the level 1 cache, a cache controller of the level 1 cache feeds back response information to the CPU core cluster 401 (where the response information is used to indicate that the data corresponding to the first address does not exist in the level 1 cache). After receiving the response information, the CPU core cluster 401 delivers the data access request to the level 2 cache 403.

The CPU core cluster 401 may deliver the data access request to the level 2 cache 403 in either of these two manners. It should be understood that a same manner may also be used for a historical data access request.

In an implementation, if the first manner is used, the data access request received by the level 2 cache 403 is forwarded by the level 1 cache. To be specific, the level 1 cache may forward, to the level 2 cache 403, the data access request delivered by the CPU core cluster 401. However, if the level 1 cache has a prefetching capability, the level 1 cache may further send a prefetch access request to the level 2 cache, where the data access request is different from the prefetch access request. If the level 1 cache has a prefetching capability, after calculating a prefetch-from address based on a prefetching algorithm corresponding to the level 1 cache, the CPU core cluster 401 may generate the prefetch access request based on the prefetch-from address. The CPU core cluster 401 sends the prefetch access request to the level 1 cache. When data corresponding to the prefetch access request does not exist in the level 1 cache, the level 1 cache delivers the prefetch access request to the level 2 cache 403. If the data exists in the level 2 cache 403, the CPU core cluster 401 loads the data from the level 2 cache to the level 1 cache. If the data does not exist in the level 2 cache 403, the CPU core cluster loads, from the memory to the level 1 cache, the data corresponding to the prefetch access request. It can be learned that an access request received by the level 2 cache 403 may include two parts: One part is the data access request, and the other part is the prefetch access request. The data access request of a first part is the data access request delivered by the CPU core cluster 401 to the level 1 cache. The prefetch access request of a second part is the prefetch access request generated by the CPU core cluster 401 based on the prefetch-from address after the CPU core cluster 401 calculates the prefetch-from address based on the prefetching algorithm corresponding to the level 1 cache. In other words, the address carried in the data access request of the first part is not calculated by using a prefetching algorithm, but an address carried in a prefetched data access request of the second part is the prefetch-from address obtained by using the prefetching algorithm corresponding to the level 1 cache. Therefore, in this embodiment of this application, if the first manner is used, the prefetcher 402 may filter out the prefetch access request from the level 1 cache, to obtain the data access request forwarded by the level 1 cache to the level 2 cache.

In a possible implementation, the prefetch access request and the data access request each may carry a tag bit (TAG), where the tag bit is used to indicate whether the access request is a prefetch access request or a data access request. For example, the tag bit may be represented by using a binary number, for example, represented by using 0 or 1, where 0 is used to indicate the data access request, and 1 is used to indicate the prefetch access request. The prefetcher 402 may filter out the prefetch access request whose tag bit is 1, and keep the data access request whose tag bit is 0.

In this embodiment of this application, the prefetcher 402 may monitor in real time data access requests received by the level 2 cache 403. For example, each time when receiving a data access request, the level 2 cache 403 can forward the data access request to the prefetcher 402, and the prefetcher 402 records the data access request. Alternatively, the level 2 cache 403 may record a received data access request by itself, and store the recorded data access request in the memory for use.

Therefore, in step 1, when learning, through monitoring, that the level 2 cache 403 receives the data access request, the prefetcher 402 can extract the first address carried in the data access request, for use in a subsequent step.

Step 2. The prefetcher 402 calculates a prefetch-from address based on a stored prefetching algorithm, a historical data access request, and the first address that is extracted in step 1.

In step 2, the prefetcher 402 requires the historical data access request. It can be understood that the historical data access request may be a data access request received by the level 2 cache 403 before the level 2 cache 403 receives the data access request in step 1. For example, in step 1, the level 2 cache 403 receives a data access request at a moment t1. Then the historical data access request is a data access request received by the level 2 cache 403 before the moment t1. For example, the historical data access request may be a data access request received within a preset time period before the moment t1. For example, the preset time period is a time period from t3 to t1, where t3 is earlier than t1, and a value of t3 may be set based on an actual case. This is not limited in this embodiment of this application.

It can be learned from FIG. 4 that the prefetcher 402 may include a feature extractor 4021 and a prefetching algorithm module 4022. Therefore, step 2, that is, a process in which the prefetcher 402 calculates the prefetch-from address based on the stored prefetching algorithm, the historical data access request, and the first address, may include substeps. For example, step 2 includes the following substeps: Step 2.1. The feature extractor 4021 may extract feature information from the historical data access request. Step 2.2. The prefetching algorithm module 4022 stores a prefetching algorithm, and may calculate an address offset based on the prefetching algorithm and the feature information that is extracted by the feature extractor 4021 in step 2.1. Step 2.3. The prefetching algorithm module 4022 obtains the prefetch-from address based on the address offset and the first address.

In this embodiment of this application, when the terminal device stores software programs of an application program, each application program corresponds to a storage location. The terminal device may store a mapping relationship between a package name of the application program and the storage location. Software programs of an application program may be stored in pages. For example, software programs of an appl are stored at a location 1 in the DDR SDRAM 406, and the software programs of the appl are stored by using three pages. When the software programs (mathematical functions and/or variables) in the pages are run, different functions can be implemented. Alternatively, when lines of the software programs (mathematical functions and/or variables) in the pages are run, different functions can be implemented. A page address may be represented by using page_addr (for example, p0 or p1), and a line address may be represented by using a cache line ID (for example, ID1 or ID2). Then p0, ID10 is used to indicate that a data storage address is line 10 in page 0. Usually, one page occupies a storage space of 4 KB, and a cache line ID occupies a storage space of 64 bytes. Therefore, each page has 64 cache line IDs.

Therefore, the data access request delivered by the CPU core cluster 401 may carry a relatively large amount of information, for example, carrying a package name of a currently running application program, the address of the currently required data in the memory, and a type of the data access request (read request or write request). Therefore, in step 2.1, the feature extractor 4021 may extract the feature information from the historical data access request, where the feature information may include the package name of the currently running application program, and the address of the to-be-accessed data in the memory, where the address may include a page address and a line address. The package name of the application program is used to determine a storage location of a software program of the application program, and the page address and the line address may be used to determine a page and a line in which the data that the CPU core cluster 401 needs to access is located in the software program at the storage location. In this embodiment of this application, after extracting the page address and the line address from the historical data access request, the feature extractor 4021 may further preprocess the page address and the line address. The line address is used as an example. The terminal device usually stores a software program of an application program in a page in a unit of fixed bytes, for example, in a unit of 4 bytes. In other words, every four bytes are used to store one piece of data. When accessing data, the prefetcher 402 may also read data in a unit of 4 bytes. The line address extracted by the prefetcher 402 from the historical data access request may not be 4 bytes. Therefore, the prefetcher 402 may align the extracted line address by 4 bytes. To be specific, the extracted line that does not occupy 4 bytes is converted, in an address alignment manner, into a line address occupying a quantity of bytes that is an integral multiple of 4 bytes, where the address alignment manner may be a zero padding manner or the like.

In step 2.1, the feature extractor 4021 may obtain N historical data access requests, and extract feature information from each historical data access request, to obtain N pieces of feature information, where a value of N may be a factory setting of the terminal device, or may be customized by a user in a process of using the terminal device, and N is a positive integer.

In step 2.2, the prefetching algorithm module 4022 calculates the address offset based on the prefetching algorithm and the feature information that is extracted by the feature extractor 4021 in step 2.1.

It can be learned from the foregoing content that the feature information that is extracted by the feature extractor 4021 in step 2.1 includes the address. In step 2.2, the address in the feature information can be used. To be specific, the prefetching algorithm module 4022 calculates the address offset based on the prefetching algorithm and the address that is carried in the historical data access request.

Figure 6:
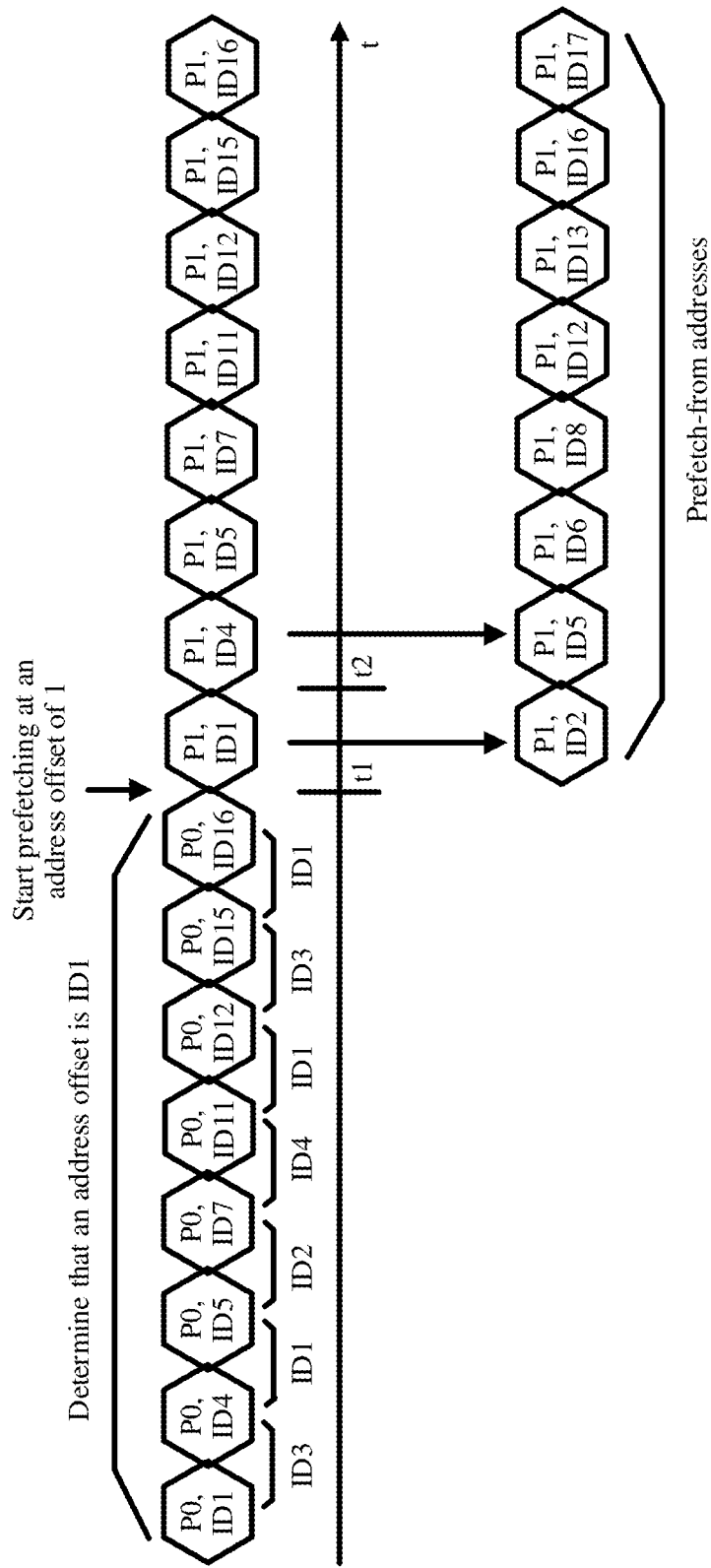
FIG. 6 is a schematic diagram illustrating that a terminal device performs data prefetching by using a prefetching algorithm according to an embodiment of this application.

For example, FIG. 6 is a schematic diagram illustrating that a terminal device performs data prefetching by using a prefetching algorithm according to an embodiment of this application. In FIG. 6, for example, N is 8. To be specific, the prefetching algorithm module 4022 extracts eight addresses (page addresses and line addresses) from eight historical data access requests. The prefetching algorithm module 4022 calculates an address offset between every two adjacent addresses of the eight addresses, to obtain seven address offsets; and determines an address offset from the seven address offsets.

Refer to FIG. 6 again, in the eight addresses, the $1^{st}$ address and the $2^{nd}$ address are two adjacent addresses, and an address offset between the $1^{st}$ address and the $2^{nd}$ address is ID3; the $2^{nd}$ address and the $3^{rd}$ address are two adjacent addresses, and an address offset between the second address and the third address is ID1; and so on. As shown in FIG. 6, address offsets between every two adjacent storage addresses are respectively ID3, ID1, ID2, ID4, ID1, ID3, and ID1 (there are seven address offsets in total). The prefetching algorithm module 4022 selects an address offset in the seven address offsets that appears most frequently, that is, ID1; and determines the address offset as an address offset to be used in the subsequent step.

In step 2.3, the prefetching algorithm module 4022 calculates the prefetch-from address based on the address offset determined in step 2.2 and the first address determined in step 1.

Still using FIG. 6 as an example, in step 2.2, the prefetching algorithm module 4022 determines that the address offset is ID1. After determining the address offset, the prefetching algorithm module 4022 performs data prefetching based on the address offset. For example, refer to FIG. 6 again. A first address carried in a data access request received by the level 2 cache 403 at a moment t1 is p1, ID1 (that is, the $9^{th}$ address in FIG. 6). The prefetching algorithm module 4022 adds the address offset ID1 to p1, ID1, to obtain a prefetch-from address, that is, p1, ID2.

Refer to FIG. 6 again, if the level 2 cache 403 then receives another data access request at a moment t2 (t2>t1), and an address carried in the data access request is p1, ID4 (that is, the $10^{th}$ address in FIG. 6), the prefetching algorithm module 4022 determines, based on p1, ID4 and the address offset ID1, that a prefetch-from address is p1, ID5. By analogy, in FIG. 6, the $11^{th}$ storage address is p1, ID5; and the prefetching algorithm module 4022 determines, based on p1, ID5 and the address offset ID1, that a prefetch-from address is p1, ID6. The $12^{th}$ storage address is p1, ID7; and the prefetching algorithm module 4022 determines, based on p1, ID7 and the address offset ID1, that a prefetch-from address is p1, ID8. The $13^{th}$ storage address is p1, ID11; and the prefetching algorithm module 4022 determines, based on p1, ID11 and the address offset ID1, that a prefetch-from address is p1, ID12. The $14^{th}$ storage address is p1, ID12; and the prefetching algorithm module 4022 determines, based on p1, ID12 and the address offset ID1, that a prefetch-from address is p1, ID13. The $15^{th}$ storage address is p1, ID15; and the prefetching algorithm module 4022 determines, based on p1, ID15 and the address offset ID1, that a prefetch-from address is p1, ID16. The $16^{th}$ storage address is p1, ID16; and the prefetching algorithm module 4022 determines, based on p1, ID16 and the address offset ID1, that a prefetch-from address is p1, ID17.

Step 3. The prefetcher 402 loads, from the memory to the level 2 cache 403 based on the prefetch-from address determined in step 2, data corresponding to the prefetch-from address.

In step 2 (specifically step 2.3), the eight prefetch-from addresses generated by the prefetching algorithm module 4022 include p1, ID2, p1, ID5, p1, ID6, p1, ID8, p1, ID12, p1, ID13, p1, ID16, and p1, ID17. Each time when generating a prefetch-from address, the prefetching algorithm module 4022 may send the prefetch-from address to the level 2 cache 403. Data corresponding to the prefetch-from address may already exist in the level 2 cache 403. Therefore, after the level 2 cache 403 receives the prefetch-from address, when determining that the data corresponding to the prefetch-from address does not exist, a cache controller of the level 2 cache 403 may feed back response information to the CPU core cluster 401. The CPU core cluster 401 loads, from the memory to the level 2 cache 403 based on the response information, the data corresponding to the prefetch-from address. Certainly, alternatively, the prefetching algorithm module 4022 may first generate the eight prefetch-from addresses, and send the eight prefetch-from addresses to the level 2 cache 403 all together. For example, after the prefetching algorithm module 4022 sends the eight prefetch-from addresses to the level 2 cache 403, if data corresponding to p1, ID2 does not exist in the level 2 cache 403, the level 2 cache 403 may send response information to the CPU core cluster; and the CPU core cluster 401 loads, from the memory to the level 2 cache 403 based on the response information, the data corresponding to p1, ID2. In this embodiment of this application, when data corresponding to a prefetch-from address does not exist in the level 2 cache 403, the CPU core cluster 401 may load, from the memory to the level 2 cache 403, the data corresponding to the prefetch-from address. Certainly, other manners may also be available. For example, when data corresponding to a prefetch-from address does not exist in the level 2 cache 403, the prefetcher 402 may search the DDR SDRAM 406 for the data by using the bus 404; and store, in the level 2 cache 403, the found data corresponding to the prefetch-from address. Alternatively, when data corresponding to a prefetch-from address does not exist in the level 2 cache 403, the level 2 cache 403 may load, from the memory to the level 2 cache 403 based on the prefetch-from address, the data corresponding to the prefetch-from address.

FIG. 6 merely illustrates a possible prefetching algorithm. In actual application, the prefetching algorithm module 4022 may alternatively perform data prefetching by using another prefetching algorithm. This is not limited in this embodiment of this application.

It can be learned from the foregoing descriptions that the terminal device provided in this embodiment of this application includes the prefetcher 402. The prefetcher 402 may calculate the prefetch-from address based on the data access request delivered by the CPU core cluster 401 to the level 2 cache 403, the historical data access request, and the prefetching algorithm. The prefetcher 402 may load, from the memory to the level 2 cache 403 based on the prefetch-from address, the data corresponding to the prefetch-from address. If requiring the data subsequently, a CPU may directly read from the level 2 cache 403, without a need to read from the DDR SDRAM 406. For the CPU, reading data from the level 2 cache 403 is more efficient than reading data from the DDR SDRAM 406. Therefore, operating efficiency of the CPU is improved.

In the foregoing embodiment, the prefetcher 402 prestores a prefetching algorithm and performs data prefetching by using the prefetching algorithm. The following describes another embodiment in which a prefetcher in a terminal device may prestore a plurality of prefetching algorithms. The prefetcher may select one of the plurality of prefetching algorithms for data prefetching. After the prefetching algorithm is selected, data prefetching is performed according to the process shown in FIG. 5.

Figure 7:
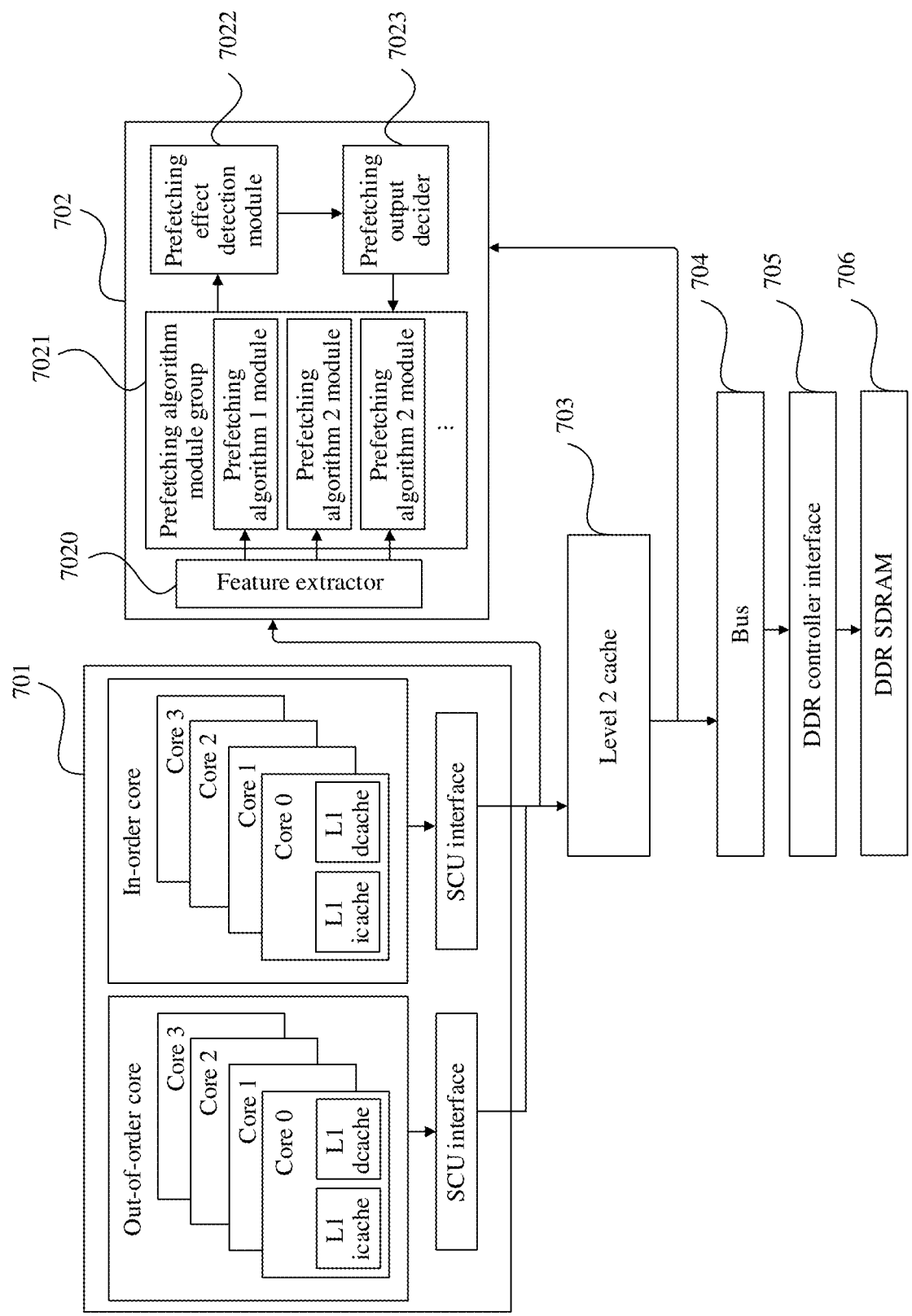
FIG. 7 is a schematic structural diagram of another terminal device having two levels of caches according to an embodiment of this application.

FIG. 7 is a schematic structural diagram of a terminal device according to an embodiment of this application. In FIG. 7, for example, the terminal device has two levels of caches. As shown in FIG. 7, the terminal device 700 may include a CPU core cluster 701, a prefetcher 702, a level 2 cache (L2 Cache) 703, a bus 704, a DDR controller 705, and a DDR SDRAM 706. The prefetcher 702 further includes a feature extractor 7020, a prefetching algorithm module group 7021, a prefetching effect detection module 7022, and a prefetching output decider 7023. The prefetching algorithm module group 7021 may include three prefetching algorithm modules, which are a prefetching algorithm 1 module, a prefetching algorithm 2 module, and a prefetching algorithm 3 module. Each prefetching algorithm module corresponds to one prefetching algorithm.

The prefetcher 702 stores a plurality of prefetching algorithms. Therefore, before performing data prefetching, the prefetcher 702 may determine a prefetching algorithm from the plurality of prefetching algorithms. The following describes manners in which the prefetcher 702 determines a prefetching algorithm from the plurality of preset algorithms.

In a possible implementation, the prefetcher 702 may determine a prefetching algorithm from the plurality of prefetching algorithms based on a current application scenario. For example, after determining a current application scenario of the terminal device, the prefetcher 702 determines a prefetching algorithm corresponding to the application scenario. Application scenarios may be various application programs used by the terminal device, for example, WeChat, email box, and web page scenarios. For example, the terminal device may store a mapping relationship between an application program and a prefetching algorithm. When determining a currently running application program, the terminal device may determine, based on a mapping relationship, a prefetching algorithm corresponding to the application program. A mapping relationship between an application program and a prefetching algorithm may be obtained by a designer through a large quantity of experiments and set as a factory setting of the terminal device, or may be set by a user in a process of using the terminal device.

Optionally, it can be learned from the foregoing content that the feature extractor 7020 of the prefetcher 702 can extract a package name of an application program from a data access request. After determining a currently running application program based on a package name of the application program, the prefetcher 702 determines a prefetching algorithm based on a mapping relationship between the application program and the prefetching algorithm. For example, when the prefetcher 702 determines that a current application scenario is a WeChat scenario, the prefetcher 702 performs data prefetching by using the prefetching algorithm 1 module.

In another possible implementation, the prefetcher 702 may determine a suitable prefetching algorithm from the plurality of prefetching algorithms through training. For example, the prefetcher 702 may have two modes, that is, a training mode and a working mode. In the training mode, the prefetcher 702 may determine a relatively suitable prefetching algorithm from the plurality of expected algorithms. It can be learned from the foregoing content that after obtaining a prefetch-from address, the prefetcher loads, from the memory to the level 2 cache 703, data corresponding to the prefetch-from address. Actually, the data is not necessarily used by the CPU core cluster 701. If most of the data is used by the CPU core cluster 701, a prefetching effect is relatively good. If just a small part of the data is used by the CPU core cluster 701, a prefetching effect is relatively poor. Therefore, the prefetcher 702 can determine, in the training mode, a prefetching algorithm that can achieve a best prefetching effect. Using a prefetching algorithm 1 as an example, the prefetching effect detection module 7022 may collect statistics about useful prefetch-from addresses (where data corresponding to these prefetch-from addresses is used by the CPU core cluster 701) and useless prefetch-from addresses (where data corresponding to these prefetch-from addresses is not used by the CPU core cluster 701) of all prefetch-from addresses generated by the prefetching algorithm 1 module, to learn of a prefetching effect of the prefetching algorithm 1 module. Therefore, in the training mode, the prefetcher 702 performs data prefetching separately by using three prefetching algorithms, and determines a prefetching algorithm having a best prefetching effect.

In this embodiment of this application, in the training mode, each prefetching algorithm module in the prefetching algorithm module group 7021 takes effect in one period. For example, in a first period, the prefetching algorithm 1 module performs data prefetching by using a prefetching algorithm 1. In a second period, the prefetching algorithm 2 module performs data prefetching by using a preset algorithm 2. In a third period, the prefetching algorithm 3 module performs data prefetching by using a preset algorithm 3.

Optionally, these three periods may be the same or different. Duration of the training mode of the prefetcher 702 is a sum of these three periods.

In the first period, the feature extractor 7020 may extract an address in each of N historical data access requests received by the level 2 cache 703. The prefetching algorithm 1 module in the prefetching algorithm module group 7021 calculates an address offset based on the address and the prefetching algorithm 1, and performs data prefetching based on the address offset. N may be 8 or may be 16, and may vary depending on an actual case. Optionally, the feature extractor 7020 may extract an address from a historical data access request at the beginning of a period in which each prefetching algorithm module takes effect. Alternatively, the feature extractor 7020 may extract an address before a period in which each prefetching algorithm module takes effect arrives; and when the period arrives, the prefetching algorithm module uses the address.

The following describes two manners for determining a prefetching effect of the prefetching algorithm 1. In both of the following two manners, a miss rate is used as an example of the prefetching effect.

Figure 8:
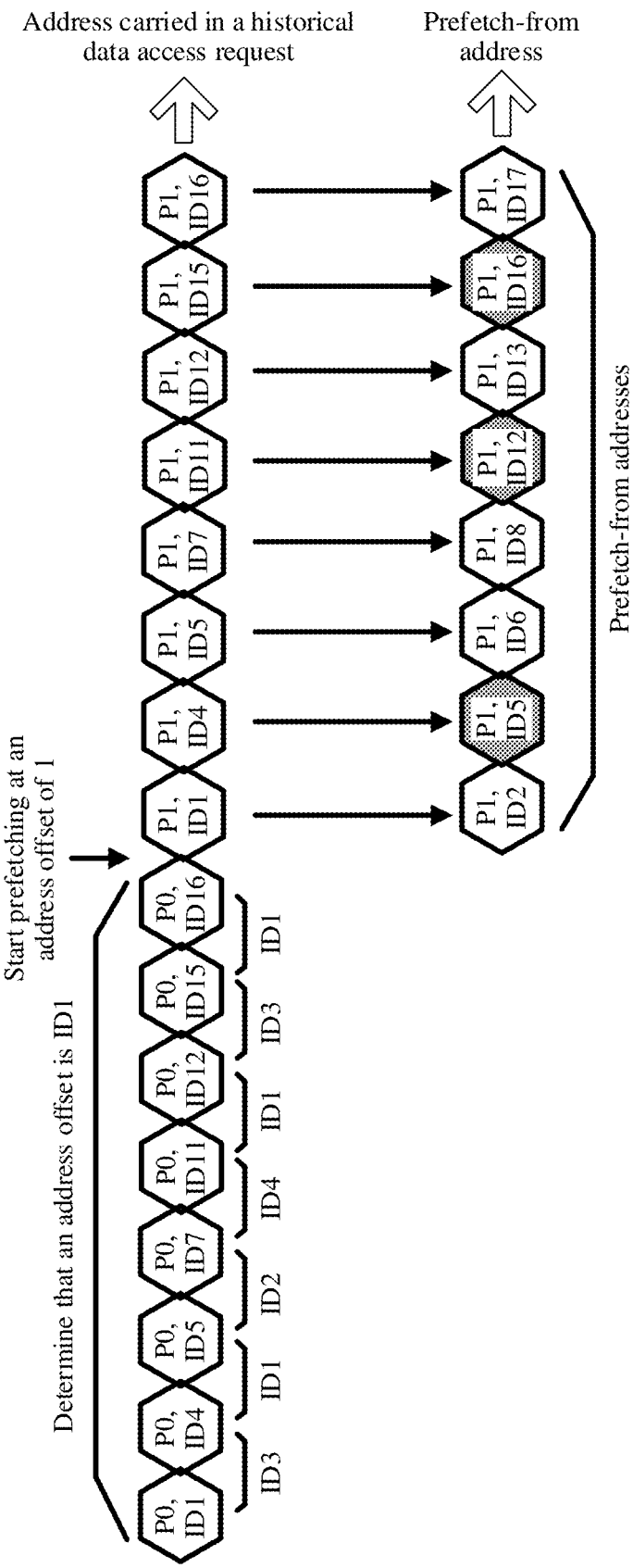
FIG. 8 is a schematic diagram illustrating that a terminal device performs data prefetching by using a prefetching algorithm 1 according to an embodiment of this application.

Manner 1: For example, N is 16. FIG. 8 is a schematic diagram of a process in which a terminal device performs training by using the prefetching algorithm 1. As shown in FIG. 8, the prefetcher 702 determines an address offset by using the first eight addresses of 16 addresses, and then generates prefetch-from addresses starting from the $9^{th}$ address based on the address offset. In other words, the prefetching algorithm 1 module generates eight prefetch-from addresses. The prefetching algorithm 1 module may compare the eight generated prefetch-from addresses with the last eight storage addresses of the 16 extracted storage addresses. If a prefetch-from address is consistent with a storage address of the last eight storage addresses, it indicates that the prefetch-from address is useful. For example, three of the eight prefetch-from addresses generated by the prefetching algorithm 1 module, that is, shaded hexagons in FIG. 8, are consistent with three of the last eight storage addresses of the 16 extracted storage addresses. The prefetching effect detection module 7022 determines that a miss rate of the prefetching algorithm 1 module is ⅝. The miss rate herein can be construed as a ratio, to a total quantity of all prefetch-from addresses, of a total quantity of actually unused prefetch-from addresses of all the prefetch-from addresses. For the prefetching algorithm 1 module, a total quantity of prefetch-from addresses is 8, and a total quantity of actually unused prefetch-from addresses is 8−3=5. Therefore, the miss rate of the prefetching algorithm 1 module is ⅝. The miss rate may be referred to as a cache miss rate or another name. This is not limited in this embodiment of this application.

Manner 2: After the prefetching algorithm 1 module generates eight prefetch-from addresses, the prefetcher 702 may load, from the DDR SDRAM 706 to the level 2 cache 403, data corresponding to the eight prefetch-from addresses. The prefetcher 702 may monitor a prefetch-from address, in the level 2 cache 703, corresponding to data that is read by the CPU core cluster 701 in preset duration. For example, in the preset duration, data corresponding to three of the eight prefetch-from addresses generated by the prefetching algorithm 1 module (that is, data corresponding to shaded hexagons in FIG. 5) is read by the CPU core cluster 701. Then the prefetching effect detection module 7022 determines that a miss rate of the prefetching algorithm 1 module is ⅝.

It should be noted that prefetching effect may alternatively be a hit rate, where the hit rate and the miss rate are relative to each other. The hit rate is used to indicate a ratio, to a total quantity of all prefetch-from addresses, of a total quantity of actually used prefetch-from addresses of all the prefetch-from address. Still using FIG. 8 as an example, the miss rate of the prefetching algorithm 1 is ⅝, that is, a hit rate is ⅜.

The foregoing merely illustrates two manners for determining the miss rate of the prefetching algorithm 1 module. In actual application, there may also be other manners for determining the miss rate of the prefetching algorithm 1 module. This is not limited in this embodiment of this application. For example, the feature extractor 7020 may obtain more than 16 data access requests, for example, 256 data access requests. In other words, there are 256 pieces of extracted feature information. The prefetching algorithm 1 module may use 16 pieces of feature information as a cycle, and perform the foregoing calculation process for every 16 pieces of feature information. In other words, one miss rate is obtained each time when a calculation is performed for 16 pieces of feature information, that is, 16 miss rates are obtained in total. An average value of the 16 miss rates is calculated and used as a final miss rate of the prefetching algorithm 1 module.

After the first period ends, the prefetcher 702 enables the prefetching algorithm 2 module to enter the second period. In the second period, when the prefetching algorithm 2 module is enabled, the prefetcher 702 may disable the prefetching algorithm 1 module. A process in which the prefetching algorithm 2 module performs data prefetching is similar to the process in which the prefetching algorithm 1 module performs data prefetching.

Figure 9:
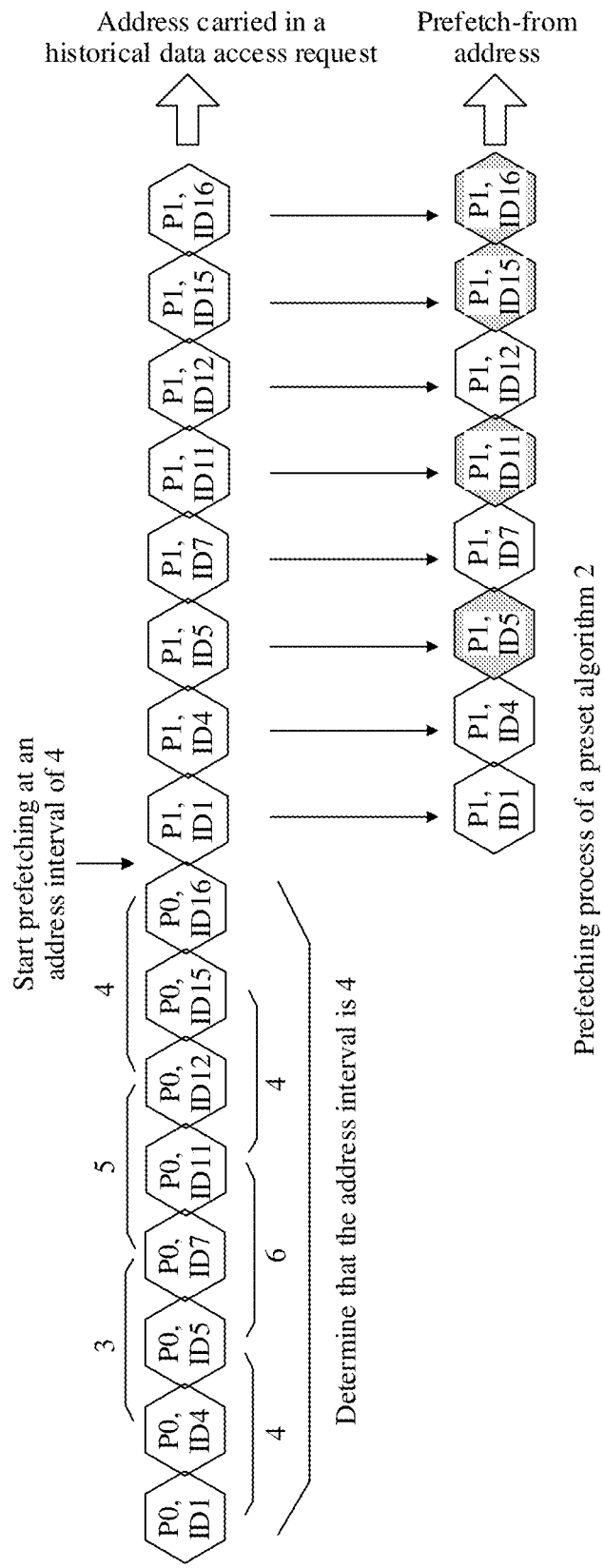
FIG. 9 is a schematic diagram illustrating that a terminal device performs data prefetching by using a prefetching algorithm 2 according to an embodiment of this application.

FIG. 9 is a schematic diagram illustrating that a terminal device performs data prefetching by using a prefetching algorithm 2 according to an embodiment of this application. In FIG. 9, for example, N is 16. The prefetching algorithm 2 module calculates an address offset between every two addresses, that are spaced by one address, of the first eight addresses. For example, the $1^{st}$ address and the $3^{rd}$ address are spaced by one address; therefore, an address offset between the $1^{st}$ address and the $3^{rd}$ address is ID4. The $2^{nd}$ address and the $4^{th}$ address are spaced by one address; therefore, an address offset between the $2^{nd}$ address and the $4^{th}$ address is ID3. By analogy, address offsets between every two addresses, that are spaced by one address, of the first eight addresses in FIG. 9 are respectively ID4, ID3, ID6, ID5, ID4, and ID4 (i.e., six values in total). The prefetching algorithm 2 module selects a value of the six values that appears most frequently, that is, ID4; and uses the value as an address offset. After determining the address offset, the prefetching algorithm 2 module generates a prefetch-from address based on the address offset.

For example, after determining the address offset based on the first eight addresses, the prefetching algorithm 2 module generates a prefetch-from address starting from the $9^{th}$ address. The $9^{th}$ address is p1, ID1; and a prefetch-from address obtained by the prefetching algorithm 2 module by adding the address offset ID4 to p1, ID1 is p1, ID5. The $10^{th}$ storage address is p1, ID4; and the prefetching algorithm 2 module determines, based on p1, ID4 and the address offset ID4, that a prefetch-from address is p1, ID8. The $11^{th}$ storage address is p1, ID5; and the prefetching algorithm 2 module determines, based on p1, ID5 and the address offset ID4, that a prefetch-from address is p1, ID9. The $12^{th}$ storage address is p1, ID7; and the prefetching algorithm 2 module determines, based on p1, ID7 and the address offset ID4, that a prefetch-from address is p1, ID11. The $13^{th}$ storage address is p1, ID11; and the prefetching algorithm 2 module determines, based on p1, ID11 and the address offset ID4, that a prefetch-from address is p1, ID15. The $14^{th}$ storage address is p1, ID12; and the prefetching algorithm 2 module determines, based on p1, ID12 and the address offset ID4, that a prefetch-from address is p1, ID16. The $15^{th}$ storage address is p1, ID15; and the prefetching algorithm 2 module determines, based on p1, ID15 and the address offset ID4, that a prefetch-from address is p1, ID19. The $16^{th}$ storage address is p1, ID16; and the prefetching algorithm 2 module determines, based on p1, ID16 and the address offset ID4, that a prefetch-from address is p1, ID20.

In summary, the eight prefetch-from addresses ultimately generated by the prefetching algorithm 2 module include p1, ID5, p1, ID8, p1, ID9, p1, ID11, p1, ID15, p1, ID16, p1, ID19, and p1, ID20. The prefetcher 702 may determine a miss rate of the prefetching algorithm 2 module according to either of the foregoing illustrated two manners for determining the miss rate of the prefetching algorithm 1 module.

For example, in preset duration, data corresponding to four of the eight prefetch-from addresses generated by the prefetching algorithm 2 module (that is, data corresponding to shaded hexagons in FIG. 7) is read by the CPU core cluster 701. Then, the prefetching effect detection module 7022 determines that the miss rate of the prefetching algorithm 2 module is 4/8. Similarly, for the prefetching algorithm 2 module, the feature extractor 7020 may obtain more than 16 data access requests, for example, 256 data access requests. In other words, there are 256 pieces of extracted feature information. The prefetching algorithm 2 module may use 16 pieces of feature information as a cycle, and perform the foregoing calculation process for every 16 pieces of feature information. In other words, one miss rate is obtained each time when a calculation is performed for 16 pieces of feature information, that is, 16 miss rates are obtained in total. An average value of the 16 miss rates is calculated and used as a final miss rate of the prefetching algorithm 2 module.

After the second period ends, the prefetcher 702 enables the prefetching algorithm 3 module to enter the third period. In the third period, when the prefetching algorithm 3 module is enabled, the prefetcher 702 may disable the prefetching algorithm 2 module. A process in which the prefetching algorithm 3 module performs data prefetching is similar to the process in which the prefetching algorithm 1 module performs data prefetching.

Figure 10:
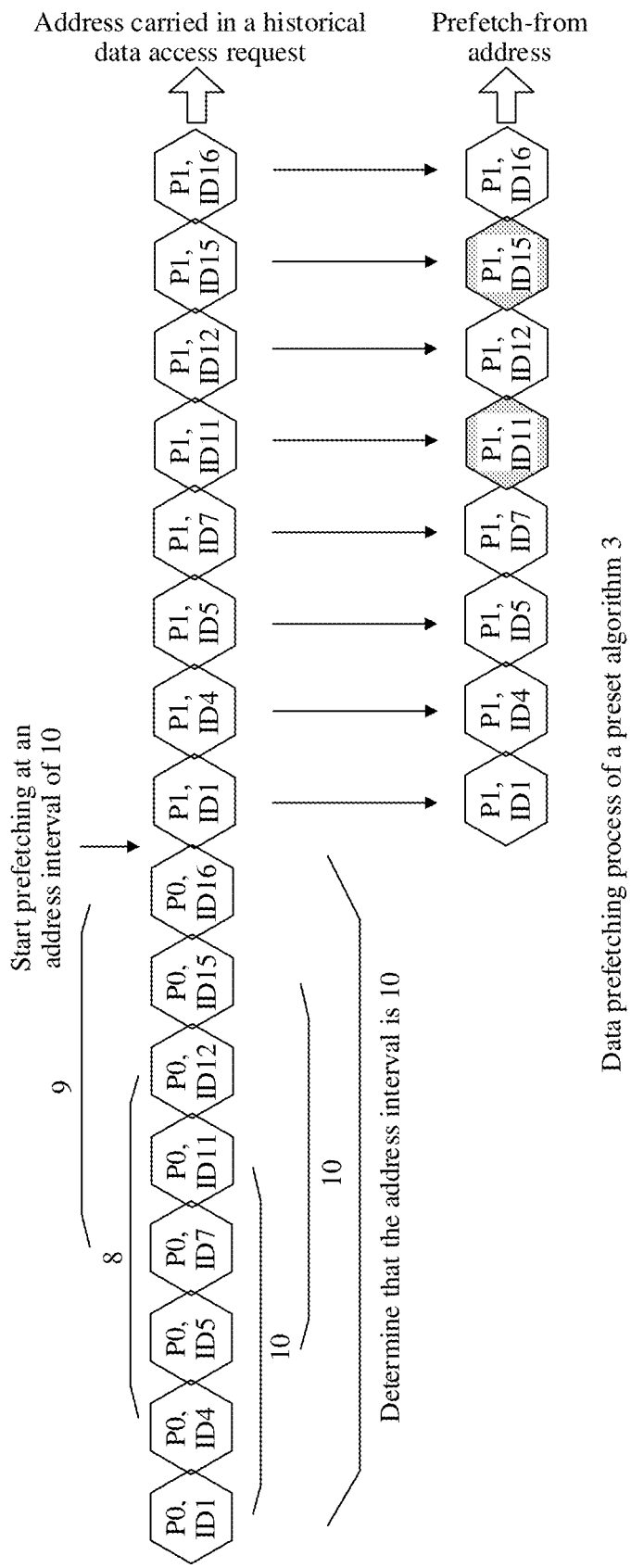
FIG. 10 is a schematic diagram illustrating that a terminal device performs data prefetching by using a prefetching algorithm 3 according to an embodiment of this application.

In the third period, a calculation process of the prefetching algorithm 3 module is similar to the calculation processes of the prefetching algorithm 1 module and the prefetching algorithm 2 module. This application provides a schematic diagram of a data prefetching process of the preset algorithm 3 module, that is, FIG. 10. After the preset algorithm 3 module performs data prefetching, the prefetching effect detection module 7022 determines that a miss rate of the preset algorithm 3 module is 6/8.

In the training mode, after determining the miss rate of each of the three prefetching algorithm modules, the prefetching effect detection module 7022 may compare the three miss rates, and determine a prefetching algorithm module with the smallest miss rate as a most suitable prefetching algorithm module. It can be learned through the comparison that the prefetching algorithm 2 module has the lowest miss rate. In other words, when data prefetching is performed by using the prefetching algorithm 2 module, there is a relatively large possibility that fetched data is read by the CPU core cluster 701. Therefore, the prefetching effect detection module 7022 determines that the prefetching algorithm 2 is a prefetching algorithm having a best prefetching effect.

In this embodiment of this application, besides the foregoing three periods, an additional period, that is, a fourth period, may further be set for the prefetcher 702. In the fourth period, the prefetcher 702 does not perform prefetching, that is, does not use any prefetching algorithm. For example, in the fourth period, the prefetching algorithm 1 module, the prefetching algorithm 2 module, and the prefetching algorithm 3 module in the prefetcher 702 are all in a disabled or sleep mode. The prefetching effect detection module 7022 can collect a miss rate in the fourth period. If the miss rate in the fourth period is lower than those in the foregoing three periods, the prefetcher 702 determines not to use any prefetching algorithm. The fourth period may arrive after the foregoing three periods, or may arrive before the foregoing three periods. For example, the prefetcher 702 does not perform prefetching in the first period, the prefetcher 702 performs data prefetching in the second period by using the prefetching algorithm 1 module, the prefetcher 702 performs data prefetching in the third period by using the prefetching algorithm 2 module, and the prefetcher 702 performs data prefetching in the fourth period by using the prefetching algorithm 3.

In this embodiment of this application, a prefetching effect may be a miss rate, and prefetching efficiency of each prefetching algorithm module may further be considered. It can be learned from the foregoing content that after the prefetcher 702 generates a prefetch-from address, because data corresponding to the prefetch-from address may already exist in the level 2 cache, the level 2 cache does not need to send the prefetch-from address to the DDR SDRAM 706. Therefore, prefetching efficiency may be construed as a ratio, to a total quantity of all prefetch-from addresses sent by the level 2 cache to the DDR SDRAM 706, of a total quantity of prefetch-from addresses actually used by a CPU among all the sent prefetch-from addresses. It can be learned that higher efficiency means that more of all the prefetch-from addresses are actually used. Therefore, a prefetching algorithm with higher prefetching efficiency is more accurate. Therefore, when considering a prefetching effect of each prefetching algorithm module, the prefetching effect detection module 7022 may consider the miss rate of the prefetching algorithm module or the prefetching efficiency of the prefetching algorithm module (that is, determine a prefetching algorithm module having highest prefetching efficiency); or may consider both factors.

After determining the most suitable prefetching algorithm module, the prefetcher 702 enters the working mode. In the working mode, the prefetcher 702 performs data prefetching by using the determined most suitable prefetching algorithm module. For example, the prefetcher 702 determines, in the training mode, that a most suitable prefetching algorithm is the prefetching algorithm 1. Then, after entering the working mode, the prefetcher 702 performs the process shown in FIG. 5 by using the prefetching algorithm 1.

Figure 11:
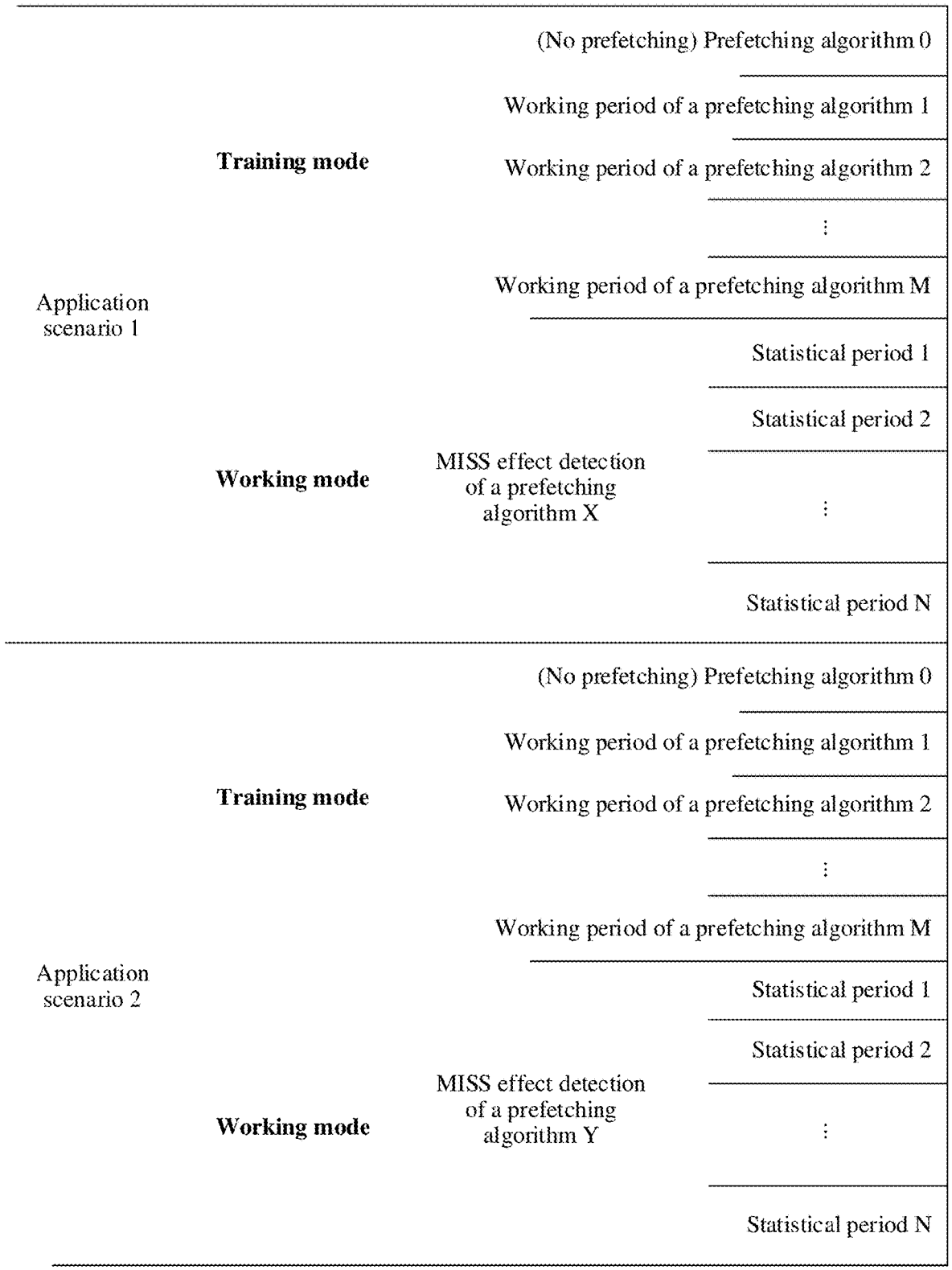
FIG. 11 is a schematic diagram of a training mode and a working mode of a prefetcher according to an embodiment of this application.

For example, as shown in FIG. 11, FIG. 11 is a schematic diagram of switchovers between two modes of a prefetcher according to an embodiment of this application. When the prefetcher 702 stores M prefetching algorithms, M+1 periods may be set. In a training mode, the prefetcher 702 does not use a prefetching algorithm in a first period, and uses one prefetching algorithm in each period starting from a second period to an $(M+1)^{th}$ period. The prefetching effect detection module 7022 collects statistics about a miss rate of the prefetching algorithm in each period, to obtain M+1 miss rates. The prefetching effect detection module 7022 determines a prefetching algorithm corresponding to a lowest miss rate of the M+1 miss rates. After the $(M+1)^{th}$ period ends, the prefetcher 702 automatically enters a working mode starting from an $(M+2)^{th}$ period.

Figure 12:
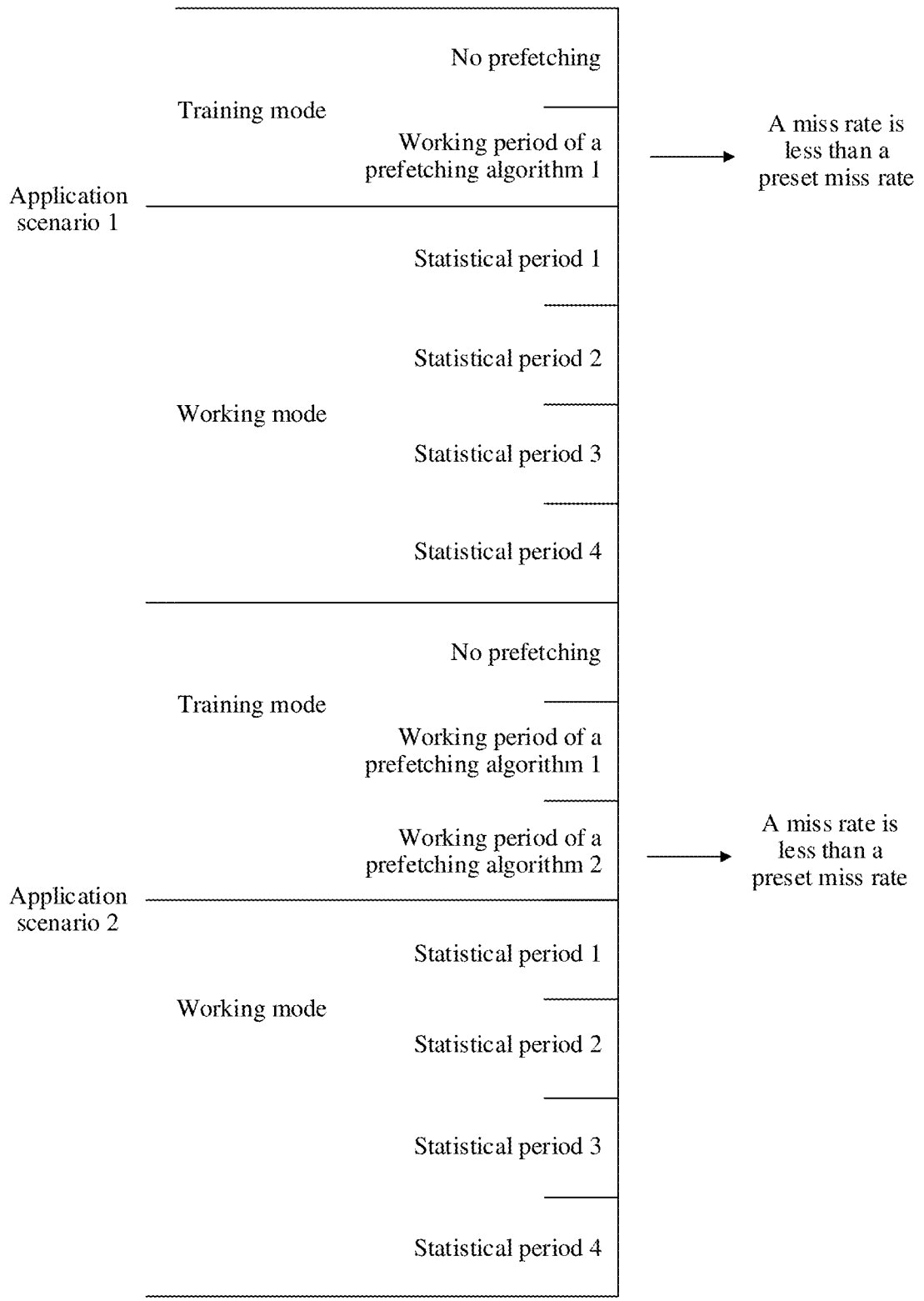
FIG. 12 is a schematic diagram of a training mode and a working mode of a prefetcher according to an embodiment of this application.

For another example, as shown in FIG. 12, FIG. 12 is a schematic diagram of switchovers between two modes of a prefetcher according to an embodiment of this application. When the prefetcher 702 stores M prefetching algorithms, M+1 periods are set. In a training mode, no prefetching algorithm is used in a first period. One prefetching algorithm is used in each period starting from a second period to an $(M+1)^{th}$ period. The prefetching effect detection module 7022 collects statistics about a miss rate of the prefetching algorithm in each period. When a miss rate of a prefetching algorithm in a period is less than or equal to a preset miss rate, the prefetching effect detection module 7022 triggers the prefetcher 702 to enter a working mode. For example, when determining that a miss rate of the prefetching algorithm 1 in the second period is less than or equal to the preset miss rate, the prefetching effect detection module 7022 triggers the prefetcher 702 to enter the working mode. In the working mode, the prefetcher 702 performs data prefetching by using the prefetching algorithm 1. In this way, the prefetcher 702 does not need to perform training from a third period to the $(M+1)^{th}$ period. This helps improve efficiency.

In this embodiment of this application, in the training mode, after determining the most suitable prefetching algorithm module, the prefetching effect detection module 7022 sends an identifier of the prefetching algorithm module (for example, a number of the prefetching algorithm module) to the prefetching output decider 7023. The prefetching output decider 7023 may enable the determined prefetching algorithm module, and disable other prefetching algorithm modules than the determined prefetching algorithm. In this way, in the working mode, the prefetcher 702 performs data prefetching by using the determined prefetching algorithm module.

After the prefetcher 702 enters the working mode, the prefetching effect detection module 7022 may monitor in real time a prefetching effect of data prefetching performed by using a current prefetching algorithm (that is, a preset algorithm determined by the prefetcher 702 in the training mode). When the prefetching effect is relatively poor, the training mode is re-entered, to re-determine a most suitable prefetching algorithm from the plurality of prefetching algorithms.

For example, in the working mode, the prefetcher 702 performs data prefetching by using the prefetching algorithm 2 module. The prefetching effect detection module 7022 may monitor a prefetching effect (a miss rate and/or prefetching efficiency) of the prefetching algorithm 2 module. When the prefetching effect of the prefetching algorithm 2 module is relatively poor, the prefetching effect detection module 7022 controls the prefetcher 702 to re-enter the training mode. For example, the prefetching effect detection module 7022 sends an instruction to the prefetching output decider 7023, so that the prefetching output decider 7023 enables all prefetching algorithm modules in sequence, to enter the training mode.

In this embodiment of this application, in the working mode, the prefetching effect detection module 7022 may collect statistics about a miss rate of data prefetching performed by using the prefetching algorithm 2 module in each of N periods. A process in which the prefetching effect detection module 7022 obtains a miss rate of each prefetching algorithm module has been described above. The prefetching effect detection module 7022 determines, based on a miss rate in each period, whether it is necessary to re-enter the training mode.

For example, when a miss rate in a period is greater than the preset miss rate, it is determined that it is necessary to re-enter the training mode.

In this embodiment of this application, the prefetcher 702 may store the preset miss rate. A specific value of the preset miss rate may be set as a factory setting of the terminal device, or may be set by terminal device through autonomous learning in a process of using the terminal device by a user. This is not limited in this embodiment of this application.

For another example, when a miss rate in a period is greater than a miss rate obtained in a case in which prefetching is not performed, it is determined that it is necessary to re-enter the training mode. It can be learned from the foregoing content that in the fourth period, the prefetcher 702 may not use any prefetching algorithm. After determining a miss rate in this period, if a miss rate in another period is greater than the miss rate in the fourth period, the prefetching effect detection module 7022 determines that it is necessary to re-enter the training mode.

For still another example, after determining N miss rates in N periods, the prefetching effect detection module 7022 determines a variance of the N miss rates; and if the variance is greater than or equal to a preset variance, determines that it is necessary to re-enter the training mode. Usually, when the variance of the N miss rates is relatively large, it is considered that a prefetching effect of a current prefetching algorithm is unstable and fluctuates relatively sharply. Therefore, the prefetcher 702 needs to re-enter the training mode to determine a suitable prefetching algorithm.

For still another example, after the prefetcher 702 determines a prefetching algorithm from the plurality of prefetching algorithms, the prefetcher 702 performs data prefetching by using the determined prefetching algorithm. After a period of time, the prefetcher 702 automatically enters the training mode.

It can be learned from the foregoing content that the prefetcher 702 may determine a suitable prefetching algorithm module based on an application scenario such as an application program, or may determine a suitable prefetching algorithm through training. In actual application, these two manners may be used independently, or may be used in combination. For example, when determining, based on a current application scenario, that there are a plurality of prefetching algorithm modules, the prefetcher 702 may further determine one preset algorithm module from the plurality of prefetching algorithm modules through training. For another example, when determining that a current application scenario is changed, the prefetcher 702 is triggered to re-enter the training mode.

Usually, when an application scenario of the terminal device is changed (for example, when the user switches from a WeChat scenario to an Honor of Kings scenario), data that the CPU core cluster 701 needs to read is changed relatively considerably. It is assumed that the terminal device is in the WeChat application scenario in a time period from 0 to t1. In this scenario, the prefetcher 702 determines, through the training mode, that a most suitable prefetching algorithm is the prefetching algorithm 2. The terminal device is in the Honor of Kings scenario in a time period from t1 to t2. In this time period, if data prefetching is still performed based on the prefetching algorithm 2, a prefetching effect may be compromised. Therefore, the prefetcher 702 may continue to determine, through training, a prefetching algorithm suitable for the Honor of Kings scenario. Therefore, in this embodiment of this application, the prefetching effect detection module 7022 in the prefetcher 702 may monitor a prefetching effect of each prefetching algorithm module in data prefetching. If the prefetching effect is relatively poor, it indicates that a current prefetching algorithm is unsuitable, and the training mode is re-entered, to re-determine a suitable prefetching algorithm. Ultimately, data prefetching in different application scenarios is performed by using a most suitable prefetching algorithm as far as possible.

Figure 13:
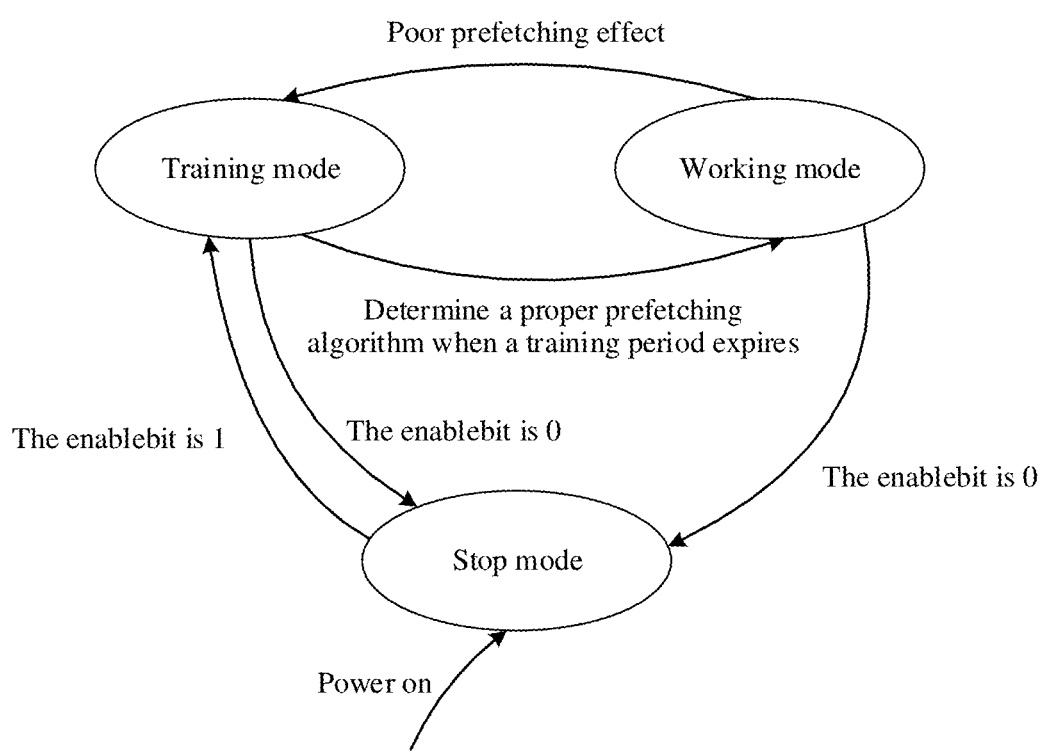
FIG. 13 is a schematic diagram of switchovers between three modes of a prefetcher according to an embodiment of this application.

FIG. 13 is a schematic diagram of switchovers between a working mode and a training mode according to an embodiment of this application. When a terminal device is in an off state (for example, a mobile phone is in a powered-off state), all modules in a prefetcher do not work and are shut down. In other words, the prefetcher is in a stop mode. When the terminal device is in an on state, the terminal device triggers, by using a software switch, the prefetcher to start working (for example, a CPU core cluster sets a software switch enablebit to 1, to control the prefetcher to start working), to enter a training mode. When a training period expires, the prefetcher enters a working mode. In the working mode, if a miss rate of a prefetching algorithm does not meet a condition (for example, a miss rate in a period is greater than a miss rate obtained in a case in which prefetching is not performed, or when a variance of N miss rates is greater than or equal to a preset variance), the training mode is re-entered. Certainly, in the working mode or the training mode, the terminal device may further control, by using the software switch, the prefetcher to enter the stop mode from the working mode or the training mode, that is, disable the prefetcher. For example, refer to FIG. 11 again, in the training mode, the CPU core cluster may set the software switch enablebit to 0, that is, control the prefetcher to enter the stop mode. Alternatively, in the working mode, the CPU core cluster may also set the software switch enablebit to 0, that is, control the prefetcher to enter the stop mode.

Figure 14:
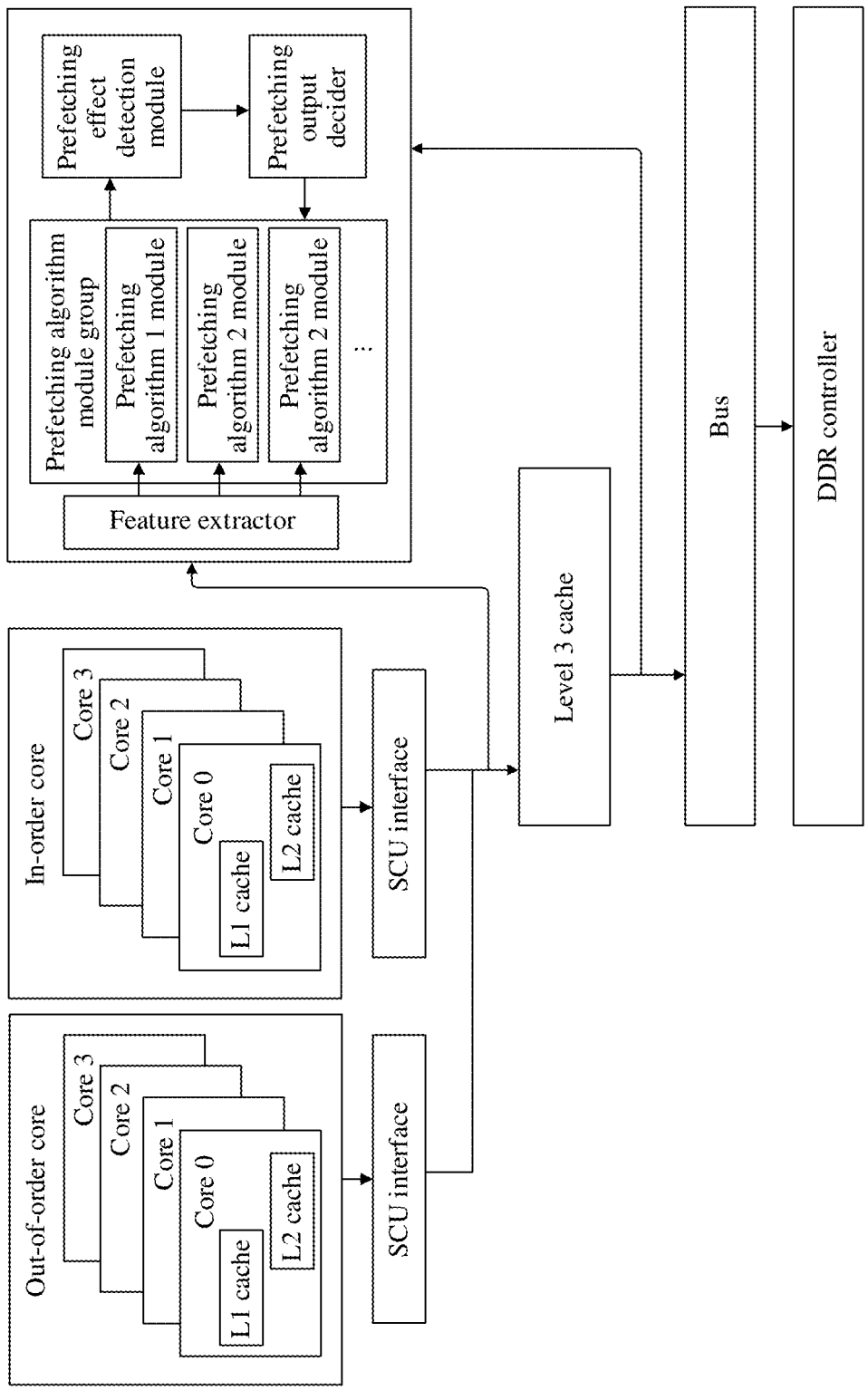
FIG. 14 is a schematic structural diagram of a terminal device having three levels of caches according to an embodiment of this application.

FIG. 4 or FIG. 7 is described by using a terminal device having two levels of caches as an example (where a prefetcher is disposed between a CPU core cluster and a level 2 cache, in other words, the prefetcher serves the level 2 cache). It can be understood that the prefetcher in FIG. 4 or FIG. 7 is also applicable to a terminal device having three levels of caches. FIG. 14 is a schematic structural diagram of a terminal device having three levels of caches according to an embodiment of this application. In FIG. 14, a prefetcher is disposed between a CPU core cluster and a level 3 cache, and the prefetcher serves the level 3 cache.

It can be understood that although in the terminal device shown in FIG. 4, FIG. 7, or FIG. 14, the prefetcher is disposed between the CPU core cluster and a last level cache (for example, in the terminal device having three levels of caches shown in FIG. 14, the prefetcher is disposed between the CPU core cluster and the level 3 cache), in other words, the prefetcher serves the last level cache, certainly, the prefetcher may alternatively be disposed between a level 1 cache and a level 2 cache (for example, in the terminal device having three levels of caches shown in FIG. 14, the prefetcher is disposed between the level 1 cache and the level 2 cache), and serves the level 2 cache. In other words, the prefetcher provided in the embodiments of this application not only can serve the last level cache, but also can serve any level of cache of the terminal device.

It can be learned from the foregoing descriptions that in the technical solutions in the embodiments of this application, the prefetcher in the terminal device provides the last level cache with a prefetching capability. This improves CPU operating efficiency. The following describes, from different perspectives, the terminal device provided in the embodiments of this application (for example, the last level cache has a prefetching capability).

I. From a Perspective of CPU Performance:

Usually, when the terminal device runs an application program, smoother pictures mean better user experience. Picture smoothness may be determined by a frame rate. A higher frame rate means that more frames are displayed per second, and pictures are smoother. Usually, a quantity of instructions that need to be executed by the terminal device to display each frame of picture is fixed.

It should be noted that a CPU usually works in a specific cycle. Running of one application program may need a plurality of cycles. For example, when running an application program, a CPU needs to call an instruction or data of the application program. A calling process of one instruction or one piece of data may take a plurality of cycles (cycle per instruction, CPI). Usually, a lower CPI (that is, calling one instruction or one piece of data requiring fewer cycles) means a higher operating speed of the CPU, and a higher CPI (that is, calling one instruction or one piece of data requiring more cycles) means a slower operating speed of the CPU. It can be learned from the foregoing descriptions that in this embodiment of this application, the last level cache has a prefetching capability, and the prefetcher can find, in the training mode, a prefetching algorithm corresponding to the lowest miss rate (which is less than a miss rate obtained in a case in which prefetching is not performed). Data reading efficiency of the CPU is improved. Therefore, time required for reading one instruction or one piece of data is reduced, that is, the CPI is reduced. In other words, time required by the terminal device to display one frame of picture is reduced, so that pictures are smoother, further improving user experience.

II. From a Perspective of CPU Power Consumption:

It can be learned from the foregoing content that the CPI can be reduced after the technical solutions in the embodiments of this application are used. After the CPI is reduced, a quantity of cycles in which the CPU needs to work is reduced, that is, a working time of the CPU is reduced, thereby increasing a sleep time. CPU power consumption during sleep is much lower than that in work. Therefore, the technical solutions can reduce the CPU power consumption.

Figure 15:
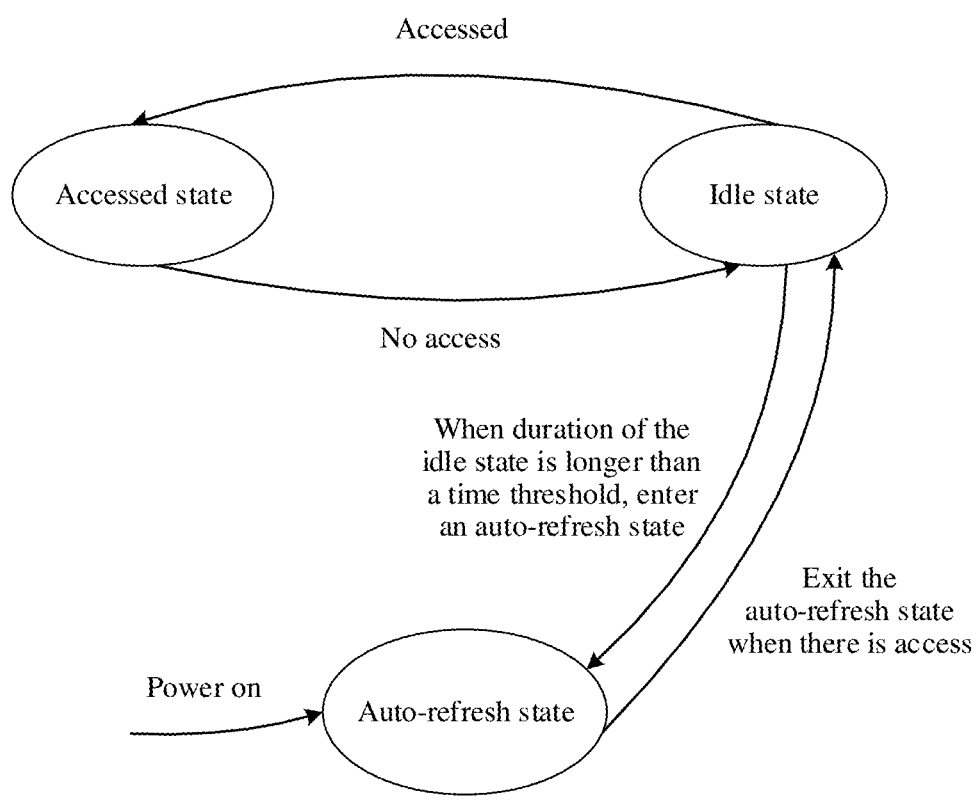
FIG. 15 is a schematic diagram of switchovers between three states of a DDR SDRAM according to an embodiment of this application.

III. From a Perspective of a DDR Controller:

Usually, the DDR controller has three access states: an auto-refresh state, an idle state, and an accessed state. FIG. 15 is a schematic diagram of switchovers between three states of a DDR according to an embodiment of this application. As shown in FIG. 15, when the terminal device is powered on, the auto-refresh state is entered. When receiving a data access request sent by a level 1 cache or a level 2 cache, the DDR controller exits the auto-refresh state and enters the idle state; and enters the accessed state after staying in the idle state for a specific period of time. After entering the accessed state, the DDR controller starts to process the data access request from the level 1 cache or the level 2 cache. In these three states, power consumption in the accessed state is highest, followed by the idle state and then the auto-refresh state. In other words, a data access process occurs when the DDR controller is in the accessed state, and data access is not performed when the DDR controller is in the idle state and the auto-refresh state. Therefore, to reduce power consumption, when data access is not performed, the DDR controller can be kept in the most power-saving auto-refresh state instead of the idle state, as far as possible.

The idle state is an intermediate state in a process of switching from the auto-refresh state to the accessed state. Therefore, duration of the idle state can be reduced by reducing a quantity of switchovers between the auto-refresh state and the accessed state. Because the last level cache of the terminal device provided in the embodiments of this application has a prefetching capability, and prefetched data can be read to the last level cache during normal data access, this helps reduce a quantity of access times. After the quantity of access times is reduced, the quantity of switchovers between the accessed state and the auto-refresh state is reduced, thereby reducing the duration of the idle state.

Figure 16:
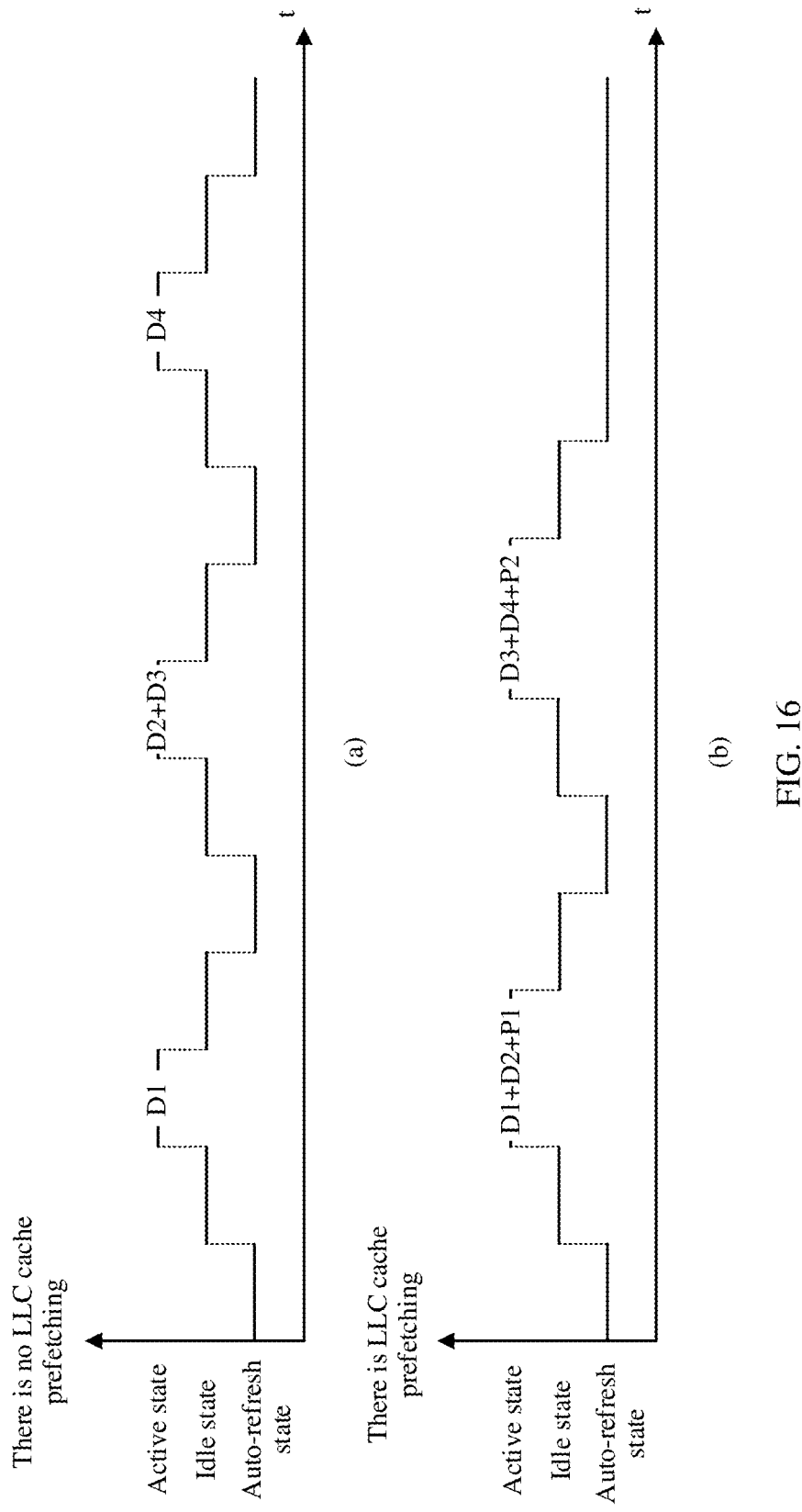
FIG. 16 is a schematic diagram of comparison of three states of a DDR SDRAM between a case in which an LLC performs prefetching and a case in which the LLC does not perform prefetching according to an embodiment of this application.

For example, as shown in FIG. 16, FIG. 16 is a schematic diagram of comparison of time occupied by each of three states between a case in which an LLC cache performs prefetching and a case in which the LLC cache does not perform prefetching according to an embodiment of this application. As shown in (a) in FIG. 16, t starts from 0. A DDR SRAM first stays in an auto-refresh state; then enters an idle state; and then enters an accessed state. In the access state, the LLC cache accesses data D1. After the access ends, the DDR SRAM enters the idle state, and then enters the auto-refresh state. Then, a next process starts to access data D2 and data D3. Then, a next process starts to access data D4. It can be seen that in (a) in FIG. 16, when the LLC cache does not perform prefetching, there are six switchovers between the auto-refresh state and the accessed state, that is, the DDR SRAM enters the idle state for six times.

As shown in (b) in FIG. 16, t starts from 0. The DDR SRAM first stays in an auto-refresh state; then enters an idle state; and then enters an accessed state. The last level cache of the terminal device has a prefetching capability, and prefetched data can be read to the last level cache during normal data access. Therefore, in the accessed state, the LLC cache accesses data D1, data D2, and prefetched data P1. After the access ends, the DDR SRAM enters the idle state, and then enters the auto-refresh state. Then, a next process starts to read data D3, data D4, and prefetched data P2. Therefore, a quantity of switchovers between the auto-refresh state and the accessed state is reduced. To be specific, a quantity of times of entering the DDR idle state is reduced from six to four. Therefore, a time ratio of the DDR idle state is reduced, thereby improving a time ratio of the DDR auto-refresh state.

The implementations of this application may be combined in any manner, to achieve different technical effects.

In the foregoing embodiments provided in this application, the method provided in the embodiments of this application is described from a perspective of the terminal device as an execution body. To implement the functions in the method provided in the embodiments of this application, the terminal device may include a hardware structure or a combination of a hardware structure and a software module. Whether a specific function of the foregoing functions is implemented in a manner of a hardware structure, a software module, or a combination of a hardware structure and a software module depends on particular applications and design constraints of the technical solutions.

An embodiment of the present technology further provides a computer storage medium. The storage medium may include a memory, and the memory may store a computer program. When the computer program is executed, a terminal device is enabled to perform all the steps performed by the terminal device that are recorded in the method embodiment shown in FIG. 5 described above.

An embodiment of the present technology further provides a computer program product. When the computer program product runs on a terminal device, the terminal device is enabled to perform all the steps performed by the terminal device that are recorded in the method embodiment shown in FIG. 5 described above.

With descriptions of the foregoing embodiments, a person skilled in the art may clearly understand that the embodiments of this application may be implemented by hardware, firmware or a combination thereof. When the present technology is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. By way of example and not limitation, the computer readable medium may include a RAM, a ROM, an electrically erasable programmable read only memory (EEPROM), a compact disc read-only memory (CD-ROM) or another compact disc memory, a magnetic disk storage medium or another magnetic storage device, or any other medium that can be used to carry or store expected program code in an instruction or data structure form and that can be accessed by a computer. In addition, any connection may be appropriately defined as a computer-readable medium. A disk and disc used in the embodiments of this application includes a compact disc (CD), a laser disc, an optical disc, a digital video disc (DVD), a floppy disk, and a Blu-ray disc, where the disk generally copies data through magnetic, and the disc copies data optically through laser. The foregoing combination should also be included in the protection scope of the computer-readable medium.

In conclusion, is the foregoing descriptions are merely embodiments of this application, but are not intended to limit the protection scope of this application. Any modification, equivalent replacement, or improvement made based on the disclosure of this application shall fall within the protection scope of this application.

What is claimed is:

1. A terminal device, comprising:
a CPU core cluster;
at least one level of cache;
a prefetcher; and
a memory, wherein
the CPU core cluster is configured to deliver a data access request to a first cache of the at least one level of cache, wherein the data access request carries a first address, and the first address is an address of data that the CPU core cluster currently needs to access in the memory; and
the prefetcher is configured to:
generate a first address offset based on a first prefetching algorithm and an address carried in a historical data access request;
generate a first prefetch-from address based on the first address offset and the first address; and
load, from the memory to the first cache based on the first prefetch-from address, data corresponding to the first prefetch-from address.

2. The terminal device according to claim 1, wherein the first cache is a last level cache of the at least one level of cache.

3. The terminal device according to claim 1, wherein
the at least one level of cache comprises two levels of cache, and the first cache is a level 2 cache of the two levels of cache; and
the CPU core cluster being configured to deliver the data access request to the first cache comprises:
the CPU core cluster being configured to deliver the data access request to a level 1 cache of the two levels of cache, wherein a cache controller of the level 1 cache is configured to send the data access request to the level 2 cache when determining that the data corresponding to the first address does not exist in the level 1 cache; or
the CPU core cluster being configured to deliver the data access request to the first cache comprises:
the CPU core cluster being configured to deliver the data access request to a level 1 cache of the two levels of cache, wherein the cache controller of the level 1 cacheb is configured to feed back response information to the CPU core cluster when determining that the data corresponding to the first address does not exist in the level 1 cache; and the CPU core cluster delivers the data access request to the level 2 cache of the two levels of cache after receiving the response information.

4. The terminal device according to claim 1, wherein the prefetcher is configured to store a plurality of prefetching algorithms, and the prefetcher is configured to determine the first prefetching algorithm from the plurality of prefetching algorithms based on an application program currently running on the terminal device.

5. The terminal device according to claim 1, wherein the prefetcher is configured to determine the first prefetching algorithm based on a hit rate or a miss rate during data prefetching, wherein the hit rate is a ratio of data that is of prefetched data and that is accessed by the CPU core cluster to the prefetched data, and the miss rate is a ratio of data that is of the prefetched data and that is not accessed by the CPU core cluster to the prefetched data.

6. The terminal device according to claim 1, wherein
the prefetcher includes N prefetching algorithms,
each prefetching algorithm takes effect in one period, and
the prefetcher is further configured to:
perform data prefetching in each of N periods based on a prefetching algorithm that takes effect in the period;
determine a first hit rate of data prefetching performed based on the prefetching algorithm that takes effect in each of the N periods, to obtain N first hit rates; and
determine a highest first hit rate of the N first hit rates, and determine that a prefetching algorithm corresponding to the highest first hit rate is the first prefetching algorithm, wherein
the first hit rate is a ratio, to the prefetched data, of data that is of the prefetched data and that is accessed by the CPU core cluster after the prefetched data is stored to the first cache by the prefetcher based on the prefetching algorithm that takes effect in the period.

7. The terminal device according to claim 1, wherein the memory is a double data rate synchronous dynamic random access memory (DDR SDRAM).

8. The terminal device according to claim 1, wherein
the at least one level of cache comprises three levels of cache; and
the CPU core cluster being configured to deliver the data access request to the first cache comprises:
the CPU core cluster being configured to deliver the data access request to a level 1 cache of the three levels of cache, wherein a cache controller of the level 1 cache is configured to send the data access request to the level 2 cache when determining that the data corresponding to the first address does not exist in the level 1 cache; and
a cache controller of the level 2 cache being configured to send the data access request to the level 3 cache when determining that the data corresponding to the first address does not exist in the level 2 cache; or
the CPU core cluster being configured to deliver the data access request to the first cache comprises:
the CPU core cluster being configured to deliver the data access request to a level 1 cache of the three levels of cache, wherein the cache controller of the level 1 cache is configured to send the data access request to the level 2 cache when determining that the data corresponding to the first address does not exist in the level 1 cache;
the cache controller of the level 2 cache being configured to feedback response information to the CPU core cluster when determining that the data corresponding to the first address does not exist in the level 2 cache; and
the CPU core cluster being further configured to deliver the data access request to the level 3 cache of the three levels of cache after receiving the response information.

9. A data prefetching method, comprising:
delivering a data access request to a first cache of at least one level of cache, wherein the data access request carries a first address, and the first address is an address of data that a CPU core cluster currently needs to access in a memory;
generating a first address offset based on a first prefetching algorithm and an address carried in a historical data access request
generating a first prefetch-from address based on the first address offset and the first address; and
loading, from the memory to the first cache based on the first prefetch-from address, data corresponding to the first prefetch-from address.

10. The method according to claim 9, wherein the first cache is a last level cache of the at least one level of cache.

11. The method according to claim 9, wherein
if the at least one level of cache comprises two levels of cache, the first cache is a level 2 cache in the two levels of cache; and
the delivering the data access request to the first cache comprises:
delivering the data access request to a level 1 cache of the two levels of cache, wherein a cache controller of the level 1 cache is configured to send the data access request to the level 2 cache when determining that the data corresponding to the first address does not exist in the level 1 cache; or
the delivering the data access request to the first cache comprises:
delivering the data access request to the level 1 cache of the two levels of cache, wherein the cache controller of the level 1 cache is configured to generate response information when determining that the data corresponding to the first address does not exist in the level 1 cache; and
delivering the data access request to the level 2 cache of the two levels of cache based on the response information.

12. The method according to claim 9, wherein before generating the first prefetch-from address, the method further comprises:
determining the first prefetching algorithm from a plurality of prefetching algorithms based on an application program currently running on the terminal device.

13. The method according to claim 9, wherein the first prefetching algorithm is determined based on a hit rate or a miss rate in data prefetching, wherein the hit rate is a ratio of data that is of prefetched data and that is accessed by the CPU core cluster to the prefetched data, and the miss rate is a ratio of data that is of the prefetched data and that is not accessed by the CPU core cluster to the prefetched data.

14. The method according to claim 9, wherein each prefetching algorithm, of N prefetching algorithms, takes effect in one period, and the method further comprises:
performing data prefetching in each of N periods based on a prefetching algorithm that takes effect in the period;
determining a first hit rate of data prefetching performed based on the prefetching algorithm that takes effect in each of the N periods, to obtain N first hit rates; and determining a highest first hit rate of the N first hit rates, and determining that a prefetching algorithm corresponding to the highest first hit rate is the first prefetching algorithm, wherein the first hit rate is a ratio, to the prefetched data, of data that is of the prefetched data and that is accessed by the CPU core cluster after the prefetched data is stored to the first cache based on the prefetching algorithm that takes effect in the period.

15. The method according to claim 9, wherein the memory is a double data rate synchronous dynamic random access memory (DDR SDRAM).

16. The method according to claim 9, wherein the at least one level of cache comprises three levels of cache; and delivering the data access request to the first cache comprises:

delivering, by the CPU core cluster, the data access request to a level 1 cache of the three levels of cache;

sending, by a cache controller of the level 1 cache, the data access request to the level 2 cache when determining that the data corresponding to the first address does not exist in the level 1 cache; and sending, by a cache controller of the level 2 cache, the data access request to the level 3 cache when determining that the data corresponding to the first address does not exist in the level 2 cache; or delivering the data access request to the first cache comprises:

delivering, by the CPU core cluster, the data access request to the level 1 cache of the three levels of cache;

sending, by the cache controller of the level 1 cache, the data access request to the level 2 cache when determining that the data corresponding to the first address does not exist in the level 1 cache;

returning, by the cache controller of the level 2 cache, response information to the CPU core cluster when determining that the data corresponding to the first address does not exist in the level 2 cache; and delivering, by the CPU core cluster, the data access request to the level 3 cache of the three levels of cache after receiving the response information.

17. A non-transitory computer readable storage medium configured to store computer readable instructions that, when executed by a processor of an information processing system, cause the information processing system to provide execution comprising:

delivering a data access request to a first cache of at least one level of cache, wherein the data access request carries a first address, and the first address is an address of data that a CPU core cluster currently needs to access in a memory;

generating a first address offset based on a first prefetching algorithm and an address carried in a historical data access request generating a first prefetch-from address based on the first address offset and the first address; and loading, from the memory to the first cache based on the first prefetch-from address, data corresponding to the first prefetch-from address.

* * * * *